United States Patent
Sekiai et al.

(10) Patent No.: US 8,209,040 B2
(45) Date of Patent: Jun. 26, 2012

(54) PLANT CONTROL APPARATUS

(75) Inventors: Takaaki Sekiai, Hitachi (JP); Akihiro Yamada, Tokai (JP); Yoshiharu Hayashi, Hitachinaka (JP); Masaki Kanada, Hitachi (JP); Toru Eguchi, Hitachi (JP); Satoru Shimizu, Hitachi (JP); Masayuki Fukai, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 990 days.

(21) Appl. No.: 11/971,976

(22) Filed: Jan. 10, 2008

(65) Prior Publication Data

US 2008/0168016 A1  Jul. 10, 2008

(30) Foreign Application Priority Data

Jan. 10, 2007 (JP) ................................. 2007-002888
Mar. 12, 2007 (JP) ................................. 2007-061843

(51) Int. Cl.
 *G05B 13/02* (2006.01)
(52) U.S. Cl. ........................................... 700/47; 700/48
(58) Field of Classification Search .................... 700/47, 700/48
See application file for complete search history.

(56) References Cited

U.S. PATENT DOCUMENTS

| | | | | |
|---|---|---|---|---|
| 3,697,957 A * | 10/1972 | Barron | ............................. | 700/47 |
| 4,064,698 A * | 12/1977 | Stern | ................................ | 60/664 |
| 4,064,699 A * | 12/1977 | Martz | ............................... | 60/664 |
| 4,577,281 A * | 3/1986 | Bukowski et al. | ............. | 700/289 |
| 4,754,410 A * | 6/1988 | Leech et al. | .................... | 706/45 |
| 5,291,390 A * | 3/1994 | Satou | ............................... | 700/54 |
| 5,764,535 A | 6/1998 | Okazaki et al. | | |
| 6,529,887 B1 | 3/2003 | Doya et al. | | |
| 6,618,631 B1 * | 9/2003 | Johnson et al. | ................. | 700/28 |
| 7,164,954 B2 * | 1/2007 | Lefebvre et al. | ................ | 700/47 |
| 2004/0083013 A1 * | 4/2004 | Tolley | .............................. | 700/47 |
| 2007/0118238 A1 * | 5/2007 | Lefebvre et al. | ................ | 700/47 |
| 2007/0234781 A1 * | 10/2007 | Yamada et al. | ................ | 73/23.2 |

FOREIGN PATENT DOCUMENTS

JP  63-240601  10/1988

(Continued)

OTHER PUBLICATIONS

Richard S. Sutton et al., Reinforcement Learning, A Bradford Book, The MIT Press.

*Primary Examiner* — Albert Decady
*Assistant Examiner* — Anthony Whittington
(74) *Attorney, Agent, or Firm* — Antonelli, Terry, Stout & Kraus, LLP.

(57) ABSTRACT

A plant control apparatus has a measurement signal DB, an operation signal DB, a numerical value analysis executing unit, a numerical value analysis result DB, a model for estimating a value of a measurement signal for an operation signal, learning unit using the model, a learning information DB, a control logic DB for information used by an operation signal generating unit, a knowledge DB for plant running characteristics, and an analyzing unit processing information in the numerical value analysis result DB by information in the knowledge DB, learning information DB, operation signal DB, and measurement signal DB, wherein the analyzing unit includes at least one of a learning base analyzing unit checking adequacy of an operation method, a signal analyzing unit for evaluating an effect of the operation signal upon the plant and presence/absence of an abnormal signal, and a knowledge DB updating unit correcting information in the knowledge DB.

20 Claims, 40 Drawing Sheets

FOREIGN PATENT DOCUMENTS

| | | |
|---|---|---|
| JP | 6-331780 | 12/1994 |
| JP | 7-159285 | 6/1995 |
| JP | 09-133321 | 5/1997 |
| JP | 9-244708 | 9/1997 |
| JP | 10-187228 | 7/1998 |
| JP | 11-250117 | 9/1999 |
| JP | 11-338340 | 12/1999 |
| JP | 2000-35956 | 2/2000 |
| JP | 2000-338854 | 12/2000 |
| JP | 2002-62927 | 2/2002 |

\* cited by examiner

FIG.15

| TIME | | | | | | SIGNAL NAME | | | | |
|---|---|---|---|---|---|---|---|---|---|---|
| YEAR | MONTH | DAY | HOUR | MINUTE | SECOND | $T_1$ | $P_1$ | $F_1$ | $D_1$ | ... |
| | | | | | | (°C) | (MPa) | (kg / s) | (ppm) | ... |
| | | | | | | | | | | |
| | | | | | | | | | | |
| | | | | | | | | | | |
| | | | | | | | | | | |
| | | | | | | | | | | |
| ⋮ | ⋮ | ⋮ | ⋮ | ⋮ | ⋮ | ⋮ | ⋮ | ⋮ | ⋮ | |

FIG.16

| | OPERATION CONDITIONS | | | |
|---|---|---|---|---|
| | A | B | C | ... |
| | (kg / s) | (kg / s) | (kg / s) | ... |
| R_0001 | | | | ... |
| R_0002 | | | | ... |
| R_0003 | | | | ... |
| R_0004 | | | | ... |
| R_0005 | | | | ... |
| ⋮ | ⋮ | ⋮ | ⋮ | ... |

ANALYSIS CONDITION SETTING

INPUT ANALYSIS CONDITIONS

STORE    RETURN

FIG.17

|  | OPERATION CONDITIONS | | | MAIN RESULTS | | DATA FILE NAME |
|---|---|---|---|---|---|---|
|  | A | B | C | CO | NOx |  |
|  | (kg / s) | (kg / s) | (kg / s) | (ppm) | (ppm) |  |
| R_0001 |  |  |  |  |  |  |
| R_0002 |  |  |  |  |  |  |
| R_0003 |  |  |  |  |  |  |
| R_0004 |  |  |  |  |  |  |
| R_0005 |  |  |  |  |  |  |
| ⋮ | ⋮ | ⋮ | ⋮ | ⋮ | ⋮ | ⋮ |

FIG.20

| | STATE | | | OPERATION AMOUNT CHANGE WIDTH | | |
|---|---|---|---|---|---|---|
| | a | b | ... | A | B | ... |
| | (kg/s) | (kg/s) | ... | (kg/s) | (kg/s) | ... |
| S_0001 | | | | | | |
| S_0002 | | | | | | |
| S_0003 | | | | | | |
| S_0004 | | | | | | |
| S_0005 | | | | | | |
| ⋮ | ⋮ | ⋮ | ⋮ | ⋮ | ⋮ | ⋮ |

FIG.21A

| | POSITION | | | CONDITIONS | | | FACTOR | INFLUENCE | ATTRIBUTE | EVALUATION VALUE |
|---|---|---|---|---|---|---|---|---|---|---|
| | X | Y | Z | TEMPER-ATURE | FLOW RATE | COMPO-SITION | | | | |
| | | | | | | | | | | |
| KA_001 | | | | | | | | | | |
| KA_002 | | | | | | | | | | |
| KA_003 | | | | | | | | | | |
| ⋮ | ⋮ | ⋮ | ⋮ | ⋮ | ⋮ | ⋮ | ⋮ | ⋮ | ⋮ | ⋮ |

FIG.21B

| | OPERTION SIGNAL CHANGE CONTENT | OBTAINED EFFECT | EVALUATION VALUE |
|---|---|---|---|
| KB_001 | | | |
| KB_002 | | | |
| KB_003 | | | |
| ⋮ | ⋮ | ⋮ | ⋮ |

FIG.21C

| | ASSUMED CAUSE | ANALYSIS CONDITION (1) | COUNTER-MEASURE | ANALYSIS CONDITION (2) | EVALUATION VALUE |
|---|---|---|---|---|---|
| KC_001 | | | | | |
| KC_002 | | | | | |
| KC_003 | | | | | |
| ⋮ | ⋮ | ⋮ | ⋮ | ⋮ | ⋮ |

FIG.22

| STATE NUMBER | OPERATION CONTENT | EFFECT ESTIMATION | IMPROVEMENT PROBABILITY | ASSUMED CAUSE | REFERENCE DIAGRAM | PAST RESULTS |
|---|---|---|---|---|---|---|
| S_0001 | | | | | | |
| S_0002 | | | | | | |
| S_0003 | | | | | | |
| S_0004 | | | | | | |
| S_0005 | | | | | | |
| ... | ... | ... | ... | ... | ... | ... |

FIG.28

| OPERATION EFFECT | | BEFORE OPERATION | AFTER OPERATION |
|---|---|---|---|
| ITEM | UNIT | | |
| CO | | | |
| NOx | | | |
| | | | |
| | | | |
| | | | |
| | | | |
| | | | |
| | | | |
| | | | |
| | | | |

OPERATION PERMITTED ?

| YES | NO | DISPLAY ANOTER APPROACH |

FIG.29

| MODIFICATION EFFECT | | BEFORE MODIFICATION | AFTER MODIFICATION |
|---|---|---|---|
| | | | |
| ITEM | UNIT | | |
| CO | | | |
| NOx | | | |
| | | | |
| | | | |
| | | | |
| | | | |
| | | | |
| | | | |
| | | | |
| | | | |

DISPLAY ANOTER APPROACH

BOILER OUTPUT PORT CROSS SECTIONAL VIEW

| | BEFORE OPERATION | | | | | AFTER OPERATION | | | | |
|---|---|---|---|---|---|---|---|---|---|---|
| OPERATION COMMAND VALUE | A kg/s 5 | B kg/s 5 | C kg/s 5 | D kg/s 5 | E kg/s 5 | A kg/s 5 | B kg/s 7 | C kg/s 5 | D kg/s 4 | E kg/s 4 |
| BOILER OUTPUT PORT CO DENSITY LOW HIGH | | | | AVERAGE 150ppm | | | 800 | | AVERAGE 100ppm | |

810
103A
103B
103C
103D
103E

| | BEFORE OPERATION | | AFTER OPERATION | |
|---|---|---|---|---|
| O₂ DENSITY LOW HIGH | 103B | 800 | 103B | 800 |

TO CHIMNEY AFTER
EXHAUST GAS PROCESSING

PLANT CONTROL APPARATUS

BACKGROUND OF THE INVENTION

The present invention relates to a plant control apparatus for controlling a plant such as a thermal power plant.

A plant control apparatus processes signals measured at a plant to be controlled to calculate control signals to be applied to the control objects. The control apparatus is equipped with an algorithm for calculating control signals so as to make signals measured at the plant satisfy target values.

There is a proportion/integration (PI) control algorithm which is used as a plant control algorithm. With PI control, a deviation between a plant measurement signal and a target value is multiplied by a proportional gain, and this multiplied value is added to a time integration value of the deviation to obtain a control signal to be applied to the control targets. The PI control algorithm can be visualized by using a block diagram or the like, and the operation principle thereof can be understood easily. The block diagram of this type is generally created by a control logic designer, and the control algorithm is free from the operation not intended by the designer. The PI control algorithm is stable and safe, and has been used in various fields.

However, if a plant is run under the conditions not anticipated because of a change in a plant running mode and environment, works such as changing control logic are required.

It is also possible to control a plant by using adaptive control or learning algorithm in order to automatically correct and change a control algorithm in accordance with a change in a plant running mode and environment. As one example of a plant control method using a learning algorithm, there have been proposed techniques about a control apparatus using reinforcement learning (e.g., refer to JP-A-2000-35956 (pp. 3 and 4, FIG. 3)). This control apparatus has a model for estimating the characteristics of control objects, and a learning unit for learning a method of generating a model input at which a model output can achieve a target value.

A boiler is a large structural body having a height as high as several ten meters, and it is difficult to grasp a phenomenon occurred in the inside thereof. A variety of phenomena occur in combination in the boiler, such as fuel combustion reaction, reaction of compositions of fuel gas, flow and thermal conduction phenomena of gas, water and vapor. Under these circumstances, various technologies have been developed in the field of hardware and control in order to suppress generation of hazardous substances in exhaust gas.

In the fields of boiler plant control, the main trend has been control logic on the basis of proportion/integration/differentiation (PID) control. In this case, it is difficult to grasp the distributions of steam temperature, steam pressure, gas composition densities and the like in the boiler used as control parameters, because the measurement areas of these control parameters are small as compared to the size of the boiler.

Providing many measurement points is difficult to be realized because of manufacture cost. Even if the number of measurement points is increased, the above-described composite phenomena are very difficult to be understood.

Technologies capable of flexibly processing the characteristics of a plant have been proposed by incorporating learning functions with teacher typically neural network, or learning functions with teacher by a reinforcement leaning method described in "Reinforcement Learning" translated by both Sadayoshi MIKAMI and Masaaki MINAKAWA, Morikita Shuppan K.K., Dec. 20, 2000. However, since it is difficult for all these technologies to confirm the cause and effect between an operation as a leaning result and a phenomenon, there is an issue of poor reliability of a new operation.

In the field of operator training, it is possible to learn a response of a boiler to an operation by using a training simulation apparatus. Techniques regarding this are disclosed in Japanese Patent Publication No. 3764585 (claim 1). According to Japanese Patent Publication No. 3764585 (claim 1), flame models of various burner combustion patterns generated by computer graphics are stored, and when cyclic images are to be reproduced, intermediate data is repetitively used to display burner combustion flame states and make a trainee understand the phenomena deeply.

If techniques described in JP-A-2000-35956 (pp. 3 and 4, FIG. 3) are utilized, a control algorithm can be automatically modified/changed in accordance with a change in a running mode and environment of a plant.

However, in order to evaluate the performance of learning results, it is necessary that a human being analyzes the learning results in detail. In order to run a plant safely, it is necessary to confirm whether a modified/changed algorithm runs correctly.

Namely, in order to use as plant control a learning algorithm capable of matching a change in a running mode and environment of a plant and running the plant easily, it is essential to improve reliability of the learning algorithm.

SUMMARY OF THE INVENTION

An issue of the present invention is to provide a plant control apparatus equipped with a unit for allowing a plant operator to easily confirm learning results, in order to improve the reliability of a learning algorithm.

As described in the prior art, it is difficult for an operator to easily understand complicated behaviors and composite phenomena in a boiler. An improper control operation may therefore be performed in some cases. This is not only desired from the viewpoint of safety, but also an amount of hazardous substances may increase because the control performance is not exhibited sufficiently.

In a control method having a leaning function in particular, learning results are generally in a black box in many cases. This leaves an issue of insufficient reliability of learning results.

Techniques disclosed in Japanese Patent Publication No. 3764585 (claim 1) allow to easily grasp a burner flame state. However, the techniques will not provide a direct cause and effect of generation of hazardous substances such as nitrogen oxide (NOx) and carbon monoxide (CO).

Another object of the present invention is to settle the above-described issues and provide a boiler plant control apparatus or an operator training apparatus capable of improving the reliability of control operations by displaying the relation between control operations and phenomena in a boiler in an easy-to-understand display state.

In order to settle the above-described issues, the present invention provides a plant control apparatus having operation signal generating unit for calculating an operation signal to be supplied to a plant by using a measurement signal representative of a running state amount of the plant, comprising: a measurement signal database for storing a past measurement signal; an operation signal database for storing a past operation signal; numerical value analysis executing unit for analyzing running characteristics of the plant; a numerical value analysis result database for storing numerical analysis results obtained by operating the numerical analysis executing unit; a model for estimating a value of a measurement signal obtained when an operation signal is applied to the plant, by using information in the numerical value analysis result database; learning unit for learning a plant operation method by using the model; a learning information database for storing learning information obtained by the learning unit; a control logic database for storing information to be used by the operation signal generating unit when an operation signal is derived; a knowledge database for storing knowledge regarding the running characteristics of the plant; analyzing unit for processing information in the numerical value analysis result database, by using information in said knowledge database, the learning information database, the operation signal database and the measurement signal database; and an analysis result database for storing an analysis result by the analyzing unit, wherein the analyzing unit includes at least one of learning base analyzing unit for evaluating adequacy of the operation method learnt by said learning unit, signal analyzing unit for evaluating an effect obtained if the operation signal is applied to the plant and presence/absence of an abnormal measurement signal, and knowledge database updating unit for adding information to or correcting information in, said knowledge database.

A control apparatus for a plant having a boiler of the present invention comprises phenomenon visualizing unit for visualizing a phenomenon in the boiler to display a relation between a control operation and the phenomenon in the boiler, and image display unit for the relation visualized by said phenomenon visualizing unit on a screen, According to the present invention, learning results can be analyzed automatically, and the analysis results of the learning results can be displayed on the screen. It is therefore possible for an operator of the plant to confirm the analysis results of the learning results. Further, since the operator of the plant can judge whether an operation signal obtained by a learning algorithm is to be input to the plant, reliability of the control apparatus installing the learning algorithm can be improved.

If a measurement signal from the plant takes an abnormal value, the reason of the abnormal value can be estimated. If the plant is required to be modified or repaired, the contents and effects of the modification and repair can be displayed on the screen.

The control apparatus of the present invention may be utilized as a training simulator for a plant operator to help the operator improve the skill.

According to the present invention, it is possible to display the relation between a control operation and a phenomenon in the boiler such as a locus of a gas in a manner easy to understand, so that reliability of the controller can be improved.

In a learning type control apparatus, the relation between phenomena and control operations, as the learning results, can be grasped easily. It is therefore possible to prevent improper operations and improve stability and safety of plant running. Understanding of the operator can be made deep, contributing to the improvement of running skill.

Other objects, features and advantages of the invention will become apparent from the following description of the embodiments of the invention taken in conjunction with the accompanying drawings.

BRIEF DESCRIPTION OF THE DRAWINGS

FIG. 15 is a diagram showing information stored in measurement signal and operation signal databases, when the plant control apparatus of the present invention is applied to the thermal power plant.

FIG. 16 shows a screen displayed on the image display apparatus when analysis conditions are input and the plant control apparatus of the present invention is applied to the thermal power plant.

FIG. 17 is a diagram showing information stored in a numerical value analysis result database, when the plant control apparatus of the present invention is applied to the thermal power plant.

FIG. 20 is a diagram showing information stored in a learning information database, when the plant control apparatus of the present invention is applied to the thermal power plant.

FIG. 21A is a diagram showing information stored in a knowledge database, when the plant control apparatus of the present invention is applied to the thermal power plant.

FIG. 21B is a diagram showing information stored in the knowledge database, when the plant control apparatus of the present invention is applied to the thermal power plant.

FIG. 21C is a diagram showing information stored in the knowledge database, when the plant control apparatus of the present invention is applied to the thermal power plant.

FIG. 22 is a diagram showing information stored in an analysis result database, when the plant control apparatus of the present invention is applied to the thermal power plant.

FIG. 28 shows a screen displayed on the image display apparatus when it is judged whether an operation is performed and the plant control apparatus of the present invention is applied to the thermal power plant.

FIG. 29 shows a screen displayed on the image display apparatus when the effect of plant remodeling is evaluated and the plant control apparatus of the present invention is applied to the thermal power plant.

DESCRIPTION OF THE INVENTION

Next, with reference to FIGS. 1 to 31C, description will be made on a plant control apparatus according to an embodiment of the present invention.

First Embodiment

Figure 1:
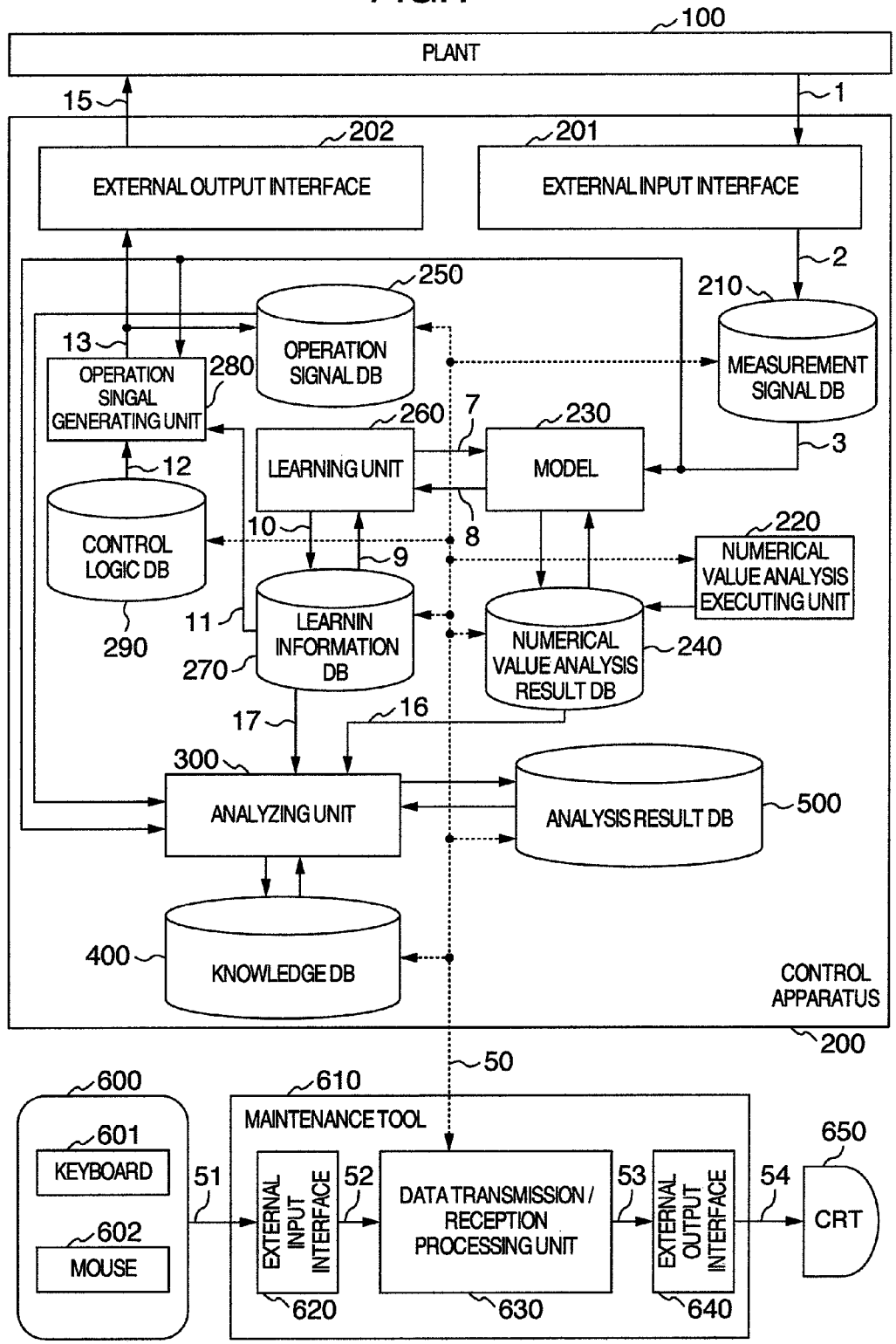
FIG. 1 is a block diagram showing a system structure of a plant control apparatus according to a first embodiment of the present invention.

FIG. 1 is a block diagram showing the system structure of the plant control apparatus according to the first embodiment of the present invention. In FIG. 1, a plant 100 is controlled by a control apparatus 200.

The control apparatus 200 for controlling the control object plant 100 has calculation apparatus including a numerical value analysis executing unit 220, a model 230, a learning unit 260, an operation signal generating unit 280 and an analyzing unit 300.

The control apparatus 200 has also databases including a measurement signal database 210, a numerical value analysis result database 240, an operation signal database 250, a learning information database 270, a control logic database 290, a knowledge database 400, and an analysis result database 500.

The control apparatus 200 has interfaces with externals, including an external input interface 201 and an external output interface 202.

The control apparatus 200 fetches a measurement signal 1 from the plant 100 via the external input interface 201, and sends an operation signal 15 to the plant 100 via the external output interface.

The control apparatus 200 fetches the measurement signal 1 from the plant 100 via the external input interface 201, and stores the fetched measurement signal 2 in the measurement signal database 210. An operation signal 13 generated by the operation signal generating unit 280 is supplied to the external output interface 202, and is also stored in the operation signal database 250.

The operation signal generating unit 280 generates the operation signal 13 by using control logic data 12 in the control logic database 290 and learning information data 11 in the learning information database 270 in order to make the measurement signal 1 have an operation target value. The control logic database 290 has a control circuit and stores control parameters to calculate and output the control logic data 12.

Learning data stored in the learning database 270 is generated by the learning unit 260. The learning unit 260 is connected to the model 230.

The model 230 has a function of simulating control characteristics of the plant 100. Namely, the model executes simulation calculations equivalent to supplying the operation signal 15 as the control command to the plant 100 and obtaining the measurement signal 1 as the control result. For the simulation calculations, the model 230 receives a model input 7 for operating the model 230, and executes simulation calculations of a control operation for the plant 100 to obtain a model output 8 as the simulation calculation result. The model output 8 is an estimated value for the measurement signal 1 of the plant 100.

The model 230 is configured in accordance with numerical value analysis results in the numerical value analysis result database 240. Numerical value analysis results stored in the numerical value analysis result database 240 are generated by the numerical value analysis executing unit 220.

The numerical value analysis executing unit 220 estimates the characteristics of the plant 100 by using a physical model simulating the plant 100. The numerical value analysis executing unit 220 three-dimensionally estimates the characteristics of the plant 100, for example, by using a three-dimensional analysis tool or the like. Calculation results by the numerical value analysis executing unit 220 are stored in the numerical value analysis result database 240.

By using information in the numerical value analysis result database 240 and measurement signal database 210, the model 230 calculates the model output 8 corresponding to the model input 7 by using statistical approach such as a neural network. The model 230 extracts, from the numerical value analysis result database 240, numerical value analysis results necessary for calculating the model output 8 corresponding to the model input 7, and interpolates the extracted numerical value analysis results. When the model characteristics estimated by the numerical value analysis executing unit 220 are different from the characteristics of the plant 100, the model 230 can be modified by using the measurement signal data 3 of the measurement signal 210, so as to make coincident the characteristics of the model 230 and plant 100.

The learning unit 260 learns a method of generating the model input 7 so that the model output 8 obtained through simulation calculations of the model 230 attains a model output target value set beforehand by an operator. The leaning unit 260 can be configured by utilizing various optimization methods such as enhancement learning and evolutionary calculation approach.

Learning information data 9 such as restriction conditions and the model output target value to be used for learning is stored in the learning information database 270. Learning information data 10 as the learning results by the learning unit 260 is stored in the learning information database 270. The learning information data 10 includes information on the state before the model input is changed and information on a method of changing the model input in this state.

The analyzing unit 300 is connected to the measurement signal database 210, operation signal database 250, numerical value analysis result database 240, learning information database 270, knowledge database 400 and analysis result database 500, and has a function of extracting information in these databases, performing various analyses of the extracted information, and transmitting the analysis results to the databases. The knowledge database 400 stores knowledge about the plant 100. For example, the knowledge database stores phenomena which occur when the measurement value of the plant 100 takes a value larger than a predetermined value, knowledge about the cause and effect between the performance and measurement value of the plant 100, and other knowledge. The detailed function of the analyzing unit 300 will be later given.

An operator of the plant 100 can access information of the databases of the control apparatus 200, by using an external input apparatus 600 including a keyboard 601 and a mouse 602, a maintenance tool 610 equipped with a data transmission/reception processing unit 630 capable of transmission/reception of data relative to the control apparatus 200, and an image display apparatus 650.

The maintenance tool 610 is constituted of an external input interface 620, the data transmission/reception processing unit 630 and an external output interface 640.

A maintenance tool input signal 51 generated by the external input apparatus 600 is fetched by the maintenance tool 610 via the external input interface 620. The data transmission/reception processing unit 630 of the maintenance tool 610 acquires database information 50 in the control apparatus 200, in accordance with information on the maintenance input signal 52.

The data transmission/reception processing unit 630 transmits the maintenance tool output signal 53 obtained by processing the database information 50, to the external output interface 640. The maintenance tool output signal 54 is displayed on the image display apparatus 650.

The measurement signal database 210, numerical value analysis result database 240, operation signal database 250, learning information database 270, control logic database 290, knowledge database 400 and analysis result database 500 are disposed inside the control apparatus 200 in this embodiment. Instead, all or some of these databases may be disposed outside the control apparatus 200.

Although the model 230, learning unit 260 and analyzing unit 300 are disposed inside the control apparatus 200, all or some of these components may be disposed outside the control apparatus 200.

For example, the learning unit 260, model 230, numerical value analysis executing unit 220, numerical value analysis result database 240 and learning information database 270 may be disposed outside the control apparatus 200, and the numerical analysis results 16, learning information data 11 and learning information data 17 may be transmitted to the control apparatus 200 via the Internet.

Figure 2:
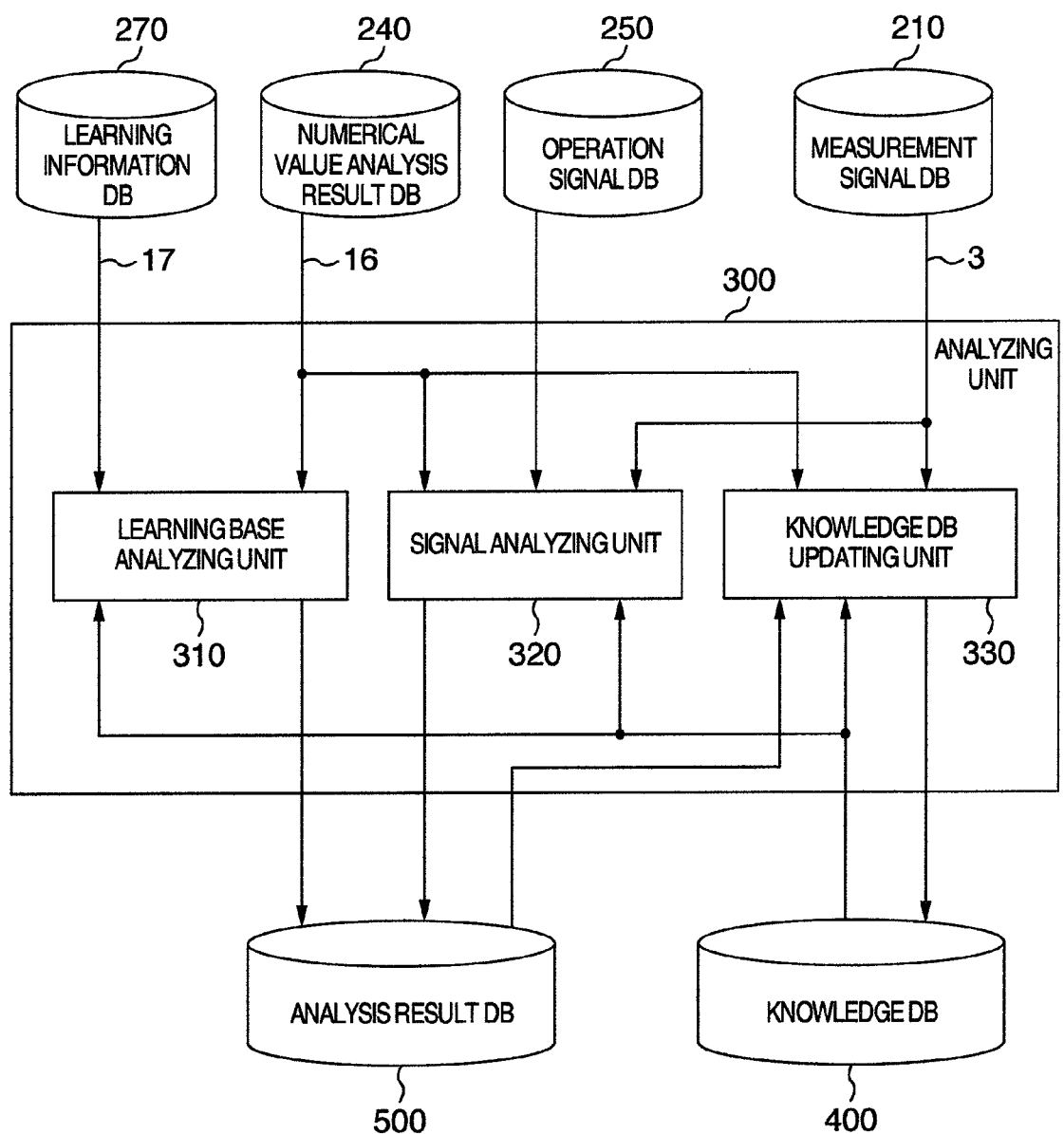
FIG. 2 is a block diagram showing an example of the structure of an analyzing unit of the plant control apparatus of the present invention.

FIG. 2 is a system diagram showing the analyzing unit 300. The analyzing unit 300 is constituted of a learning base analyzing unit 310, a signal analyzing unit 320 and a knowledge database updating unit 330.

The learning base analyzing unit 310 analyzes the base on which a learning result in the learning information database 270 was obtained, by referring to the information in the numerical value analysis result database 240 and knowledge database 400, and transmits the analysis result to the analysis result database 500.

The signal analyzing unit 320 processes the information in the operation signal database 250 and measurement signal database 210 by referring to the information in the numerical value analysis result database 240 and knowledge database 400, analyzes the effect of updating the operation signal and whether there is an abnormal measurement signal, and transmits the analysis results to the analysis result database 500.

The knowledge database updating unit 330 evaluates knowledge in the knowledge database 400 by referring to the information in the numerical value analysis result database 240, measurement signal database 210, and analysis result database 500. When necessary, the knowledge database updating unit is provided with a function of correcting knowledge in the knowledge database 400 or a function of adding new knowledge.

Figure 3:
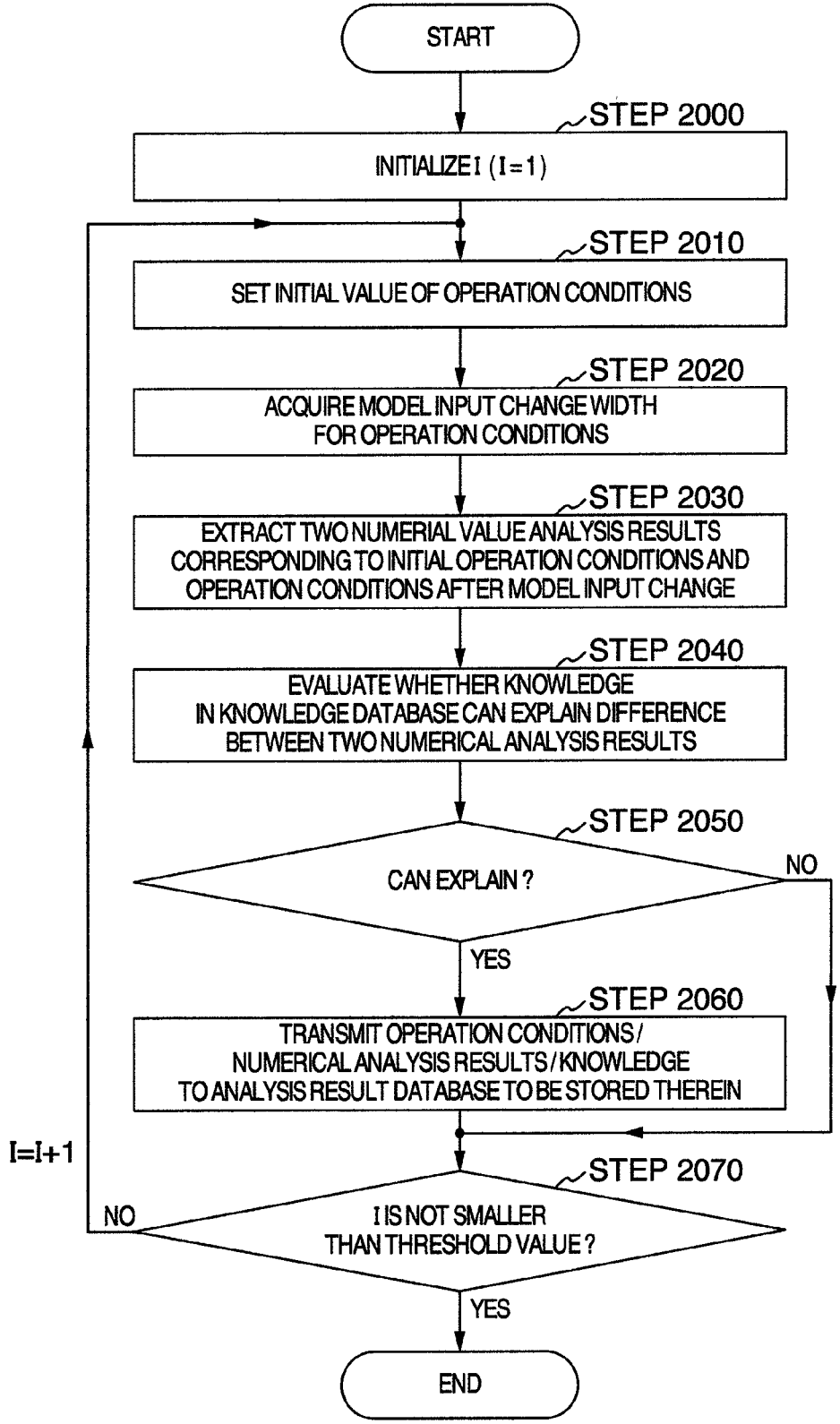
FIG. 3 is a block diagram showing an example of the structure of a learning base analyzing unit of the plant control apparatus of the present invention.

FIG. 3 is a flow chart illustrating the operation of the learning base analyzing unit 310. The operation of the learning base analyzing unit 310 is performed by a combination of Steps 2000, 2010, 2020, 2030, 2040, 2050, 2060 and 2070.

At Step 2000, I is initialized (I=1), I being a value representative of the number of repetitions of Steps 2010 to 2060. Next, at Step 2010 an initial value of operation conditions is set. At Step 2020 a model input change width for the operation conditions set at Step 2010 is acquired from the learning information database 270.

At Step 2030 two numerical analysis results are extracted from the numerical analysis result database 240, the two numerical analysis results corresponding to the operation conditions set at Step 2010 and the operation conditions after the model input change width extracted at Step 2020 added to the model input of the operation conditions.

Next, at Step 2040 it is evaluated whether knowledge in the knowledge database 400 can explain a difference between the two numerical value analysis results extracted at Step 2030. Step 2050 is a branch step whereat the flow advances to Step 2060 if it is judged at Step 2040 that the difference can be explained, or the flow advances to Step 2070 if it is judged that the difference cannot be explained.

At Step 2060 the two operation conditions and two numerical analysis results and the knowledge used at Step 2040 are transmitted to the analysis result database 500 to be stored therein.

At Step 2070 I representative of the number of repetitions of Steps 2010 to 2060 is compared with a predetermined threshold value. If I is smaller than the threshold value, 1 is added to I to thereafter return to Step 2010, whereas if I is larger than the threshold value, the flow advances to Step whereat the operation of the learning base analyzing unit is terminated.

The above-described operation stores the two numerical value analysis results before and after updating the model input and the knowledge capable of explaining a difference between the two numerical value analysis results, in the analysis result database 500. The operator of the plant 100 can display these pieces of information on the image display apparatus 650 by using the maintenance tool 610. It is therefore possible to recognize easily whether the operation method learnt by the learning unit 260 is proper or not. It is also possible to know the effect of the model input change.

Figure 4:
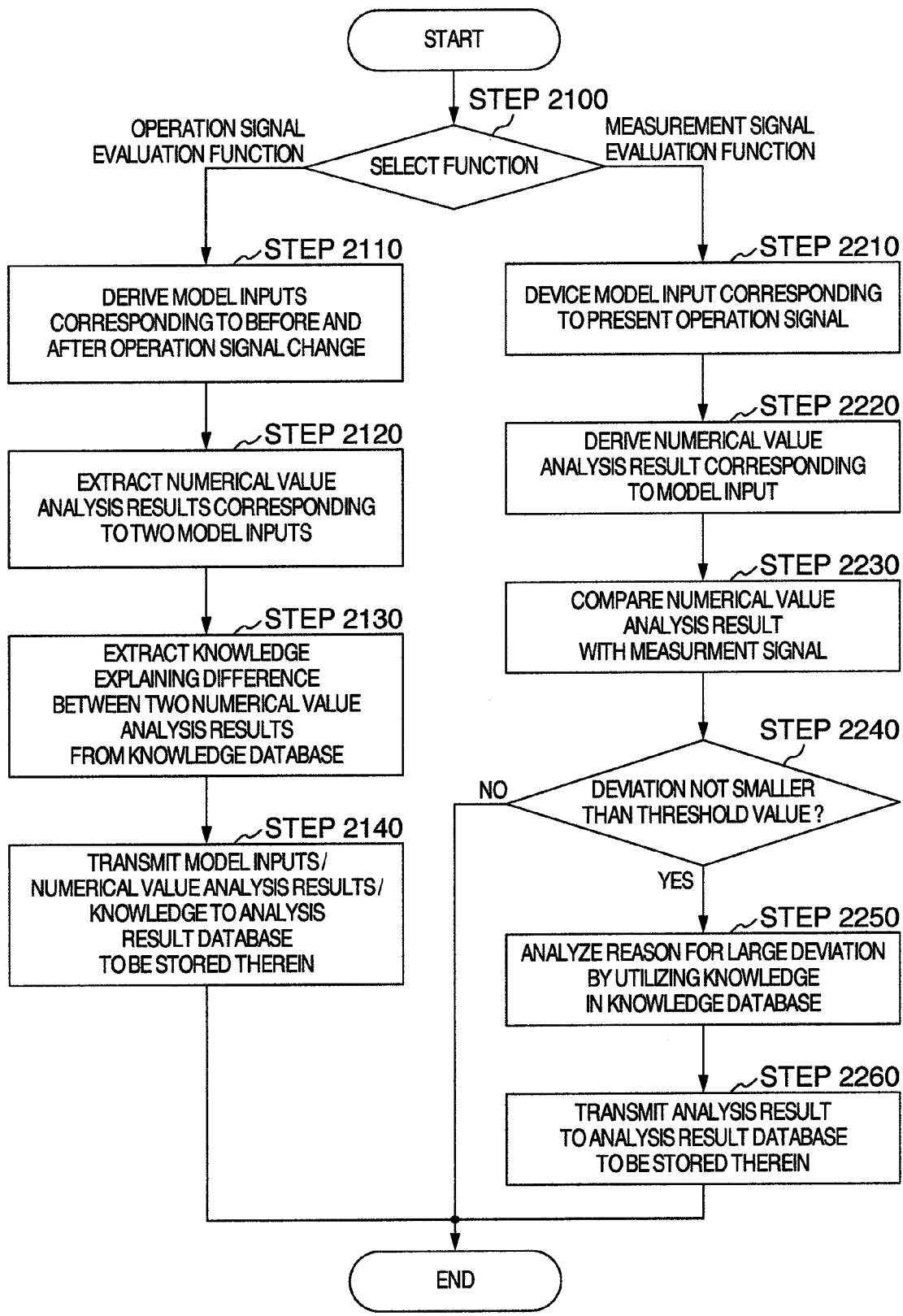
FIG. 4 is a block diagram showing an example of the structure of a signal analyzing unit of the plant control apparatus of the present invention.

FIG. 4 is a flow chart illustrating the operation of the signal analyzing unit 320. The signal analyzing unit 320 has two functional blocks including an operation signal evaluation functional block and a measurement signal evaluation functional block. At Step 2100 it is judged which one of the two functional blocks is selected.

The operation signal evaluation functional block executes a combination of Steps 2100, 2110, 2120, 2130 and 2140, and the measurement signal evaluation functional block executes a combination of Steps 2210, 2220, 2230, 2240, 2250 and 2260.

The operation signal evaluation functional block derives model inputs corresponding to those before and after an operation signal is input, analyzes numerical analysis results corresponding to the two model inputs, and refers to the knowledge in the knowledge database 400. It is therefore possible to study the reason why the control characteristics change with an operation signal change.

At Step 2110 operation signals before and after the operation signal change are extracted from the operation signal database 250 to derive two model inputs. At Step 2120 numerical analysis results corresponding to the two model inputs are extracted from the numerical value analysis result database 240. At Step 2130 knowledge explaining a difference between the two numerical value analysis results extracted at Step 2120 is extracted from the knowledge database 400. Lastly, the model inputs derived at Step 2110, numerical analysis results extracted at Step 2120 and knowledge extracted at Step 2130 are transmitted to the analysis result database 500 to be stored therein.

The measurement signal evaluation functional block compares the measurement signal with the numerical analysis result, if a difference therebetween is large, judges that the measurement signal of the plant 100 is an abnormal value, and can estimate the reason of the abnormal value by using the knowledge in the knowledge database 400.

At Step 2210 present operation conditions are extracted from the operation signal database 250, and a corresponding model input is derived. Step 2220 extracts the numerical analysis result corresponding to the model input derived at Step 2210. Step 2230 calculates a deviation between the numerical analysis result and measurement signal. If the deviation calculated at Step 2230 is larger than a predetermined threshold value, Step 2240 advances to Step 2250, whereas if the deviation is smaller than the threshold value, Step 2240 advances to Step whereat the operation is terminated. Step 2250 analyzes the reason why the deviation is larger than the threshold value, by utilizing the knowledge in the knowledge database 400. Step 2260 transmits the analysis result at Step 2250 to the analysis result database 500 to be stored therein.

Figure 5:
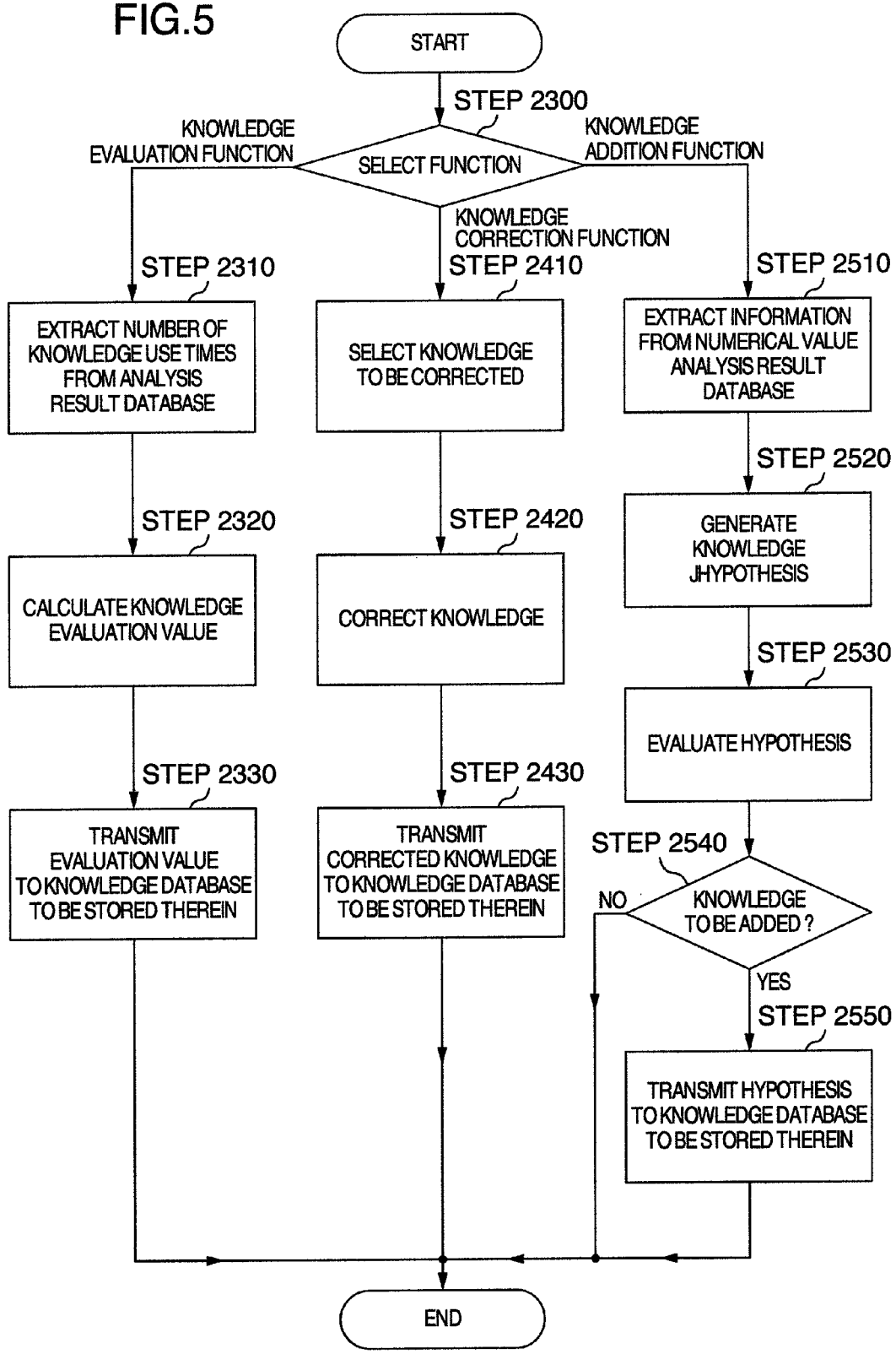
FIG. 5 is a flow chart illustrating an operation of a knowledge database updating unit of the plant control apparatus of the present invention.

FIG. 5 is a flow chart illustrating the operation of the knowledge database updating unit 330. The knowledge database updating unit 330 has three functional blocks including a knowledge evaluation functional block, a knowledge correction functional block and a knowledge addition functional block. Step 2300 selects one of three blocks to be used.

The knowledge evaluation block executes a combination of Steps 2310, 2320 and 2330, the knowledge correction functional block executes a combination of Steps 2410, 2420 and 2430, and the knowledge addition functional block executes a combination of Steps 2510, 2520, 2530, 2540 and 2550.

The knowledge evaluation functional block evaluates validity of the knowledge in the knowledge database 400.

At Step 2310 the knowledge used by the learning base analyzing unit 310 and signal analyzing unit 320 is extracted from the analysis result database 500, and drives the number of use times of each knowledge in the knowledge database 400. In accordance with the number of use times derived at Step 2310, Step 2320 calculates an evaluation value for each knowledge. For example, an evaluation value of the knowledge having a larger number of use times is set to a large value, whereas an evaluation value of the knowledge having a smaller number of use times is set to a small value. Step 2330 transmits the evaluation value calculated at Step 2330 to the knowledge database 400 to be stored therein.

When the learning base analyzing unit 310 and signal analyzing unit 320 are executed, the knowledge in the knowledge database 400 is referred to at Steps 2040, 2130 and 2250. Although all of the knowledge in the knowledge database 400 can be referred to, a large amount of knowledge may result in a long calculation time. In order to avoid this, when the knowledge in the knowledge database 400 is referred to, some knowledge having a large evaluation value is selected and only this knowledge is referred to so that the knowledge can be referred to efficiently in a limited time.

The knowledge correction functional block compares the information in the measurement signal database 210, operation signal database 250 and numerical value analysis result database 240 with the knowledge in the knowledge database 400. If the knowledge in the knowledge database 400 contradicts the information in the measurement signal database 210, operation signal database 250 and numerical value analysis result database 240, it is judged that the knowledge has an error, and the knowledge in the knowledge database 400 is corrected.

In accordance with this judgment, Step 2410 selects knowledge to be corrected. Step 2420 corrects the knowledge so as to eliminate the contradiction. Step 2430 transmits the new knowledge corrected at Step 2420 to the knowledge database 400 to be stored therein.

The knowledge correction functional block may be operated to correct knowledge having a small evaluation value.

Lastly, description will be made on the knowledge addition functional block. The knowledge addition functional block generates a hypothesis capable of explaining one numerical value analysis result in the numerical value analysis result database 240. If this hypothesis can explain sufficiently other numerical value analysis results, this hypothesis is registered as knowledge in the knowledge database 400.

At Step 2510 a numerical value analysis result is extracted from the numerical value analysis result database 240. Step 2520 generates a hypothesis capable of explaining the numerical value analysis result extracted at Step 2510. It is evaluated at Step 2530 whether the hypothesis generated at Step 2520 can explain other numerical value analysis results in the numerical value analysis result database 240. It is judged at Step 2540 from the evaluation results at Step 2530 whether the hypothesis is to be added to the knowledge database 400. If the hypothesis is to be added, the flow advances to Step 2550, whereas not, the knowledge addition functional block is terminated. At Step 2550 the hypothesis generated at Step 2530 is transmitted to the knowledge database 400 to be stored therein.

The learning base analyzing unit 310, signal analyzing unit 320 and knowledge database 330 constituting the analyzing unit 300 have been described above.

FIGS. 6 to 10 show an embodiment of screens to be displayed on the image display apparatus 650.

Figure 6:
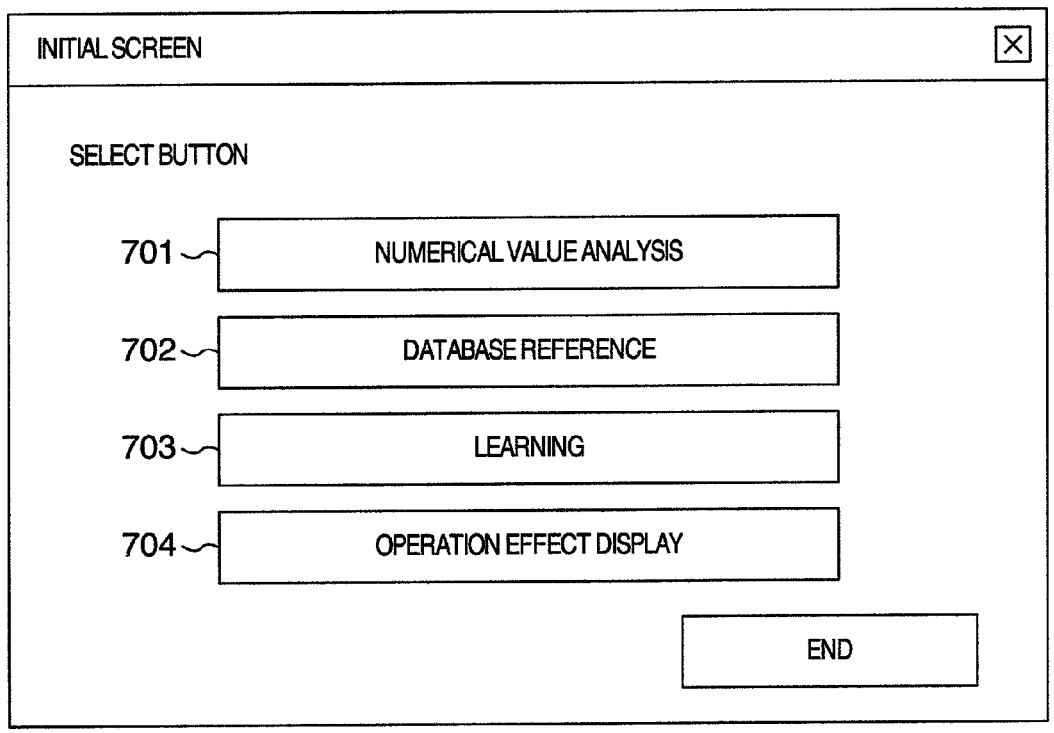
FIG. 6 shows an initial screen displayed on an image display apparatus connected to the plant control apparatus of the present invention.

FIG. 6 shows an initial screen. In the state that the initial screen shown in FIG. 6 is displayed on the image display apparatus 650, as the mouth 602 is operated to move the cursor on a button and clicked, the button can be selected. As one of buttons 701, 702, 703 and 704 is selected, a corresponding one of screens shown in FIGS. 7 to 10 is displayed on the image display apparatus 650.

Figure 7:
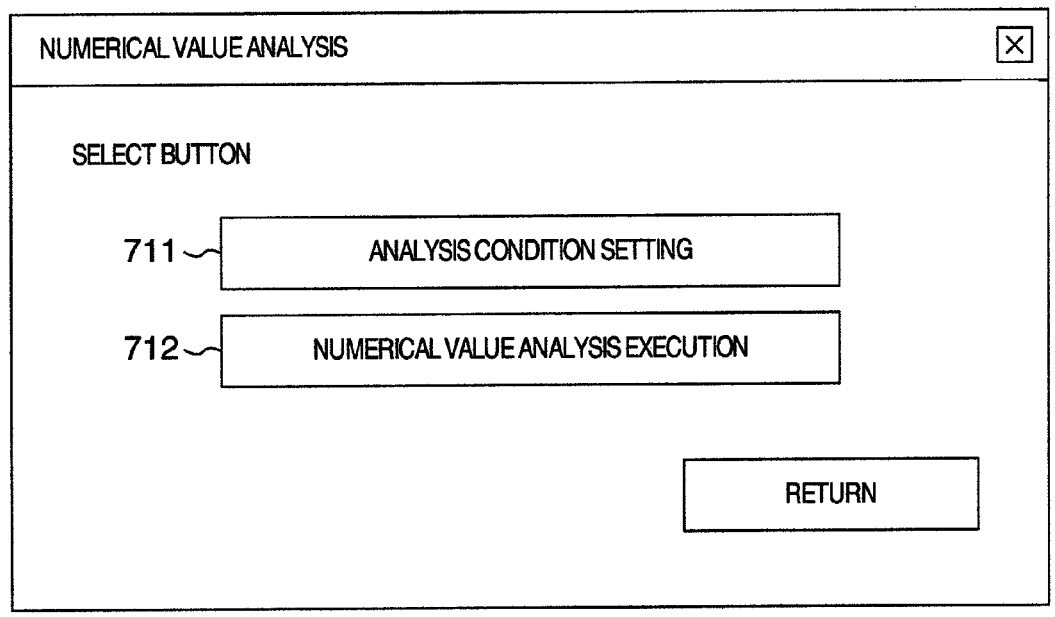
FIG. 7 shows a screen displayed on the image display apparatus when numerical analysis is executed by the plant control apparatus of the present invention.

In FIG. 7, as a button 711 is selected, various analysis conditions necessary for executing calculations at the numerical value analysis executing unit 220 can be input/set. As a button 712 is selected, the numerical value analysis executing unit 220 can start calculations. As a button 713 is selected, the screen returns to FIG. 6.

Figure 8:
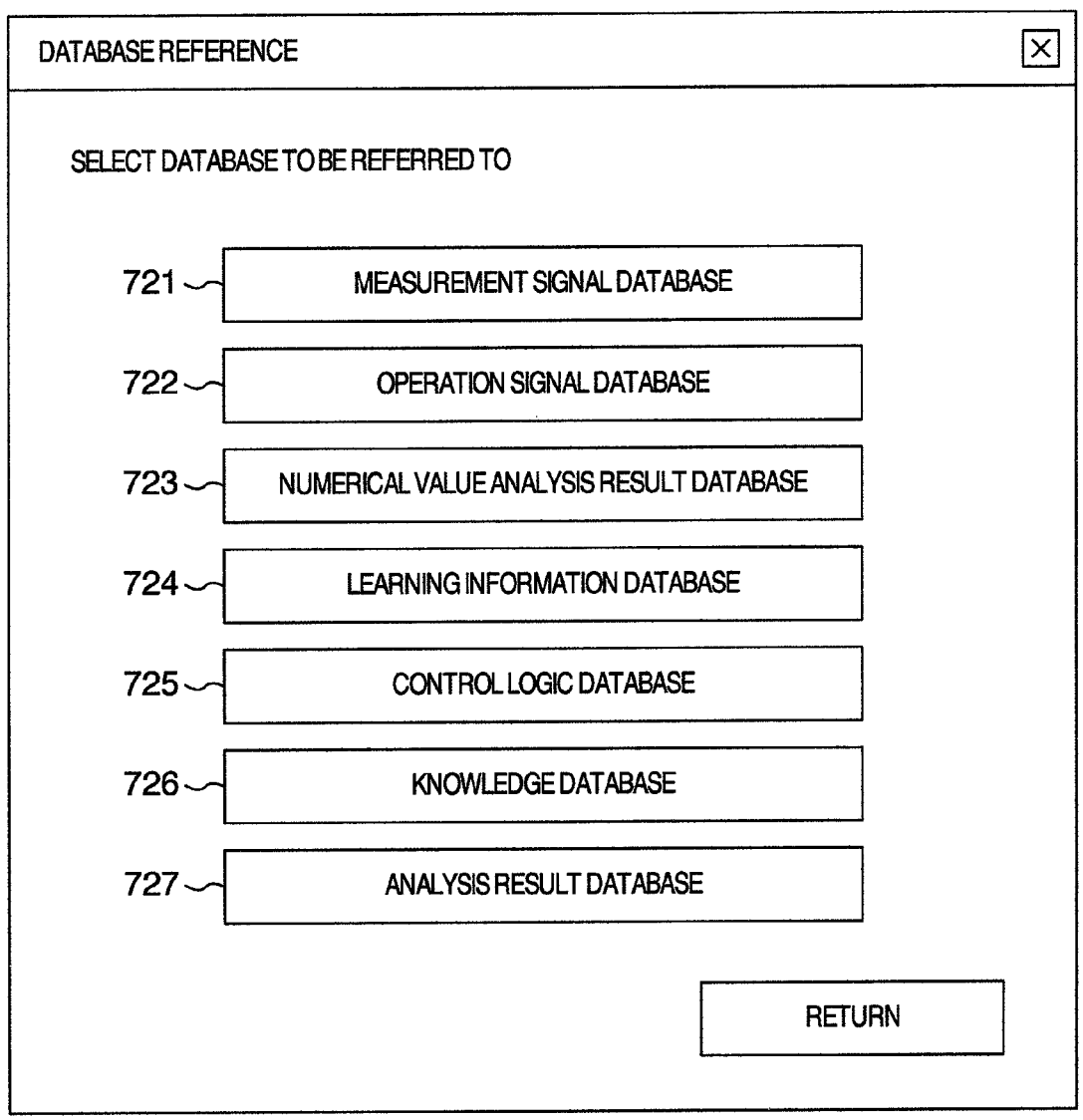
FIG. 8 shows a screen displayed on the image display apparatus when reference is made to a database in the plant control apparatus of the present invention.

In FIG. 8, it is possible to select the database whose information is to be displayed on the image display apparatus 650. As one of buttons 721, 722, 723, 724, 725, 726 and 727 is selected, a corresponding one of the measurement signal database 210, operation signal database 250, numerical value analysis result database 240, learning information database 270, control logic database 290, knowledge database 400 and analysis result database 500 can be accessed. The information in each database can be displayed on the image display apparatus 650, and it is possible to execute add/change/erase of information relative to the database.

Figure 9:
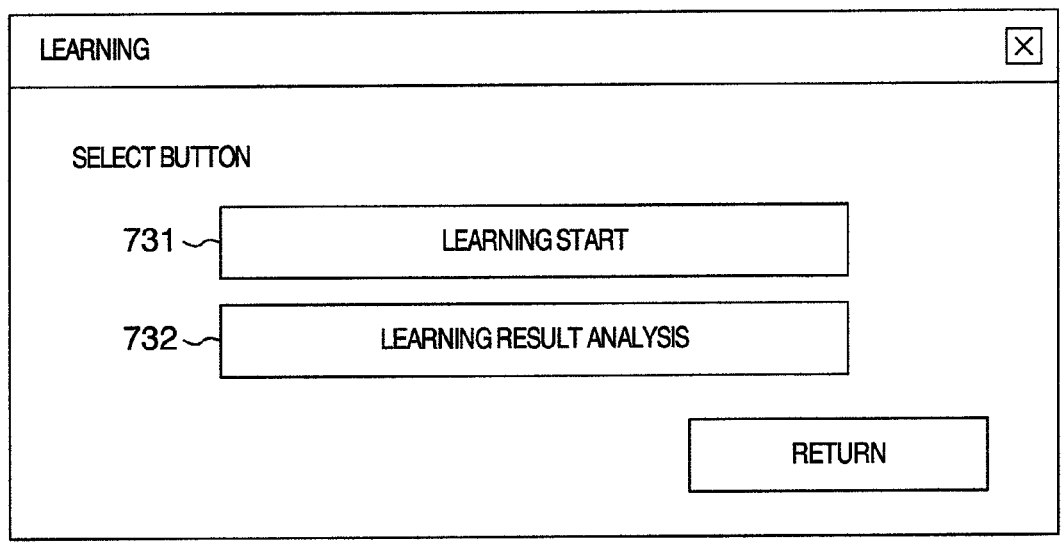
FIG. 9 shows a screen displayed on the image display apparatus when leaning is executed by the plant control apparatus of the present invention.

In FIG. 9, as a button 731 is selected, the leaning unit 260 and model 230 can be operated to learn an operation method. As a button 732 is selected, the learning base analyzing unit 310 can be operated.

Figure 10:
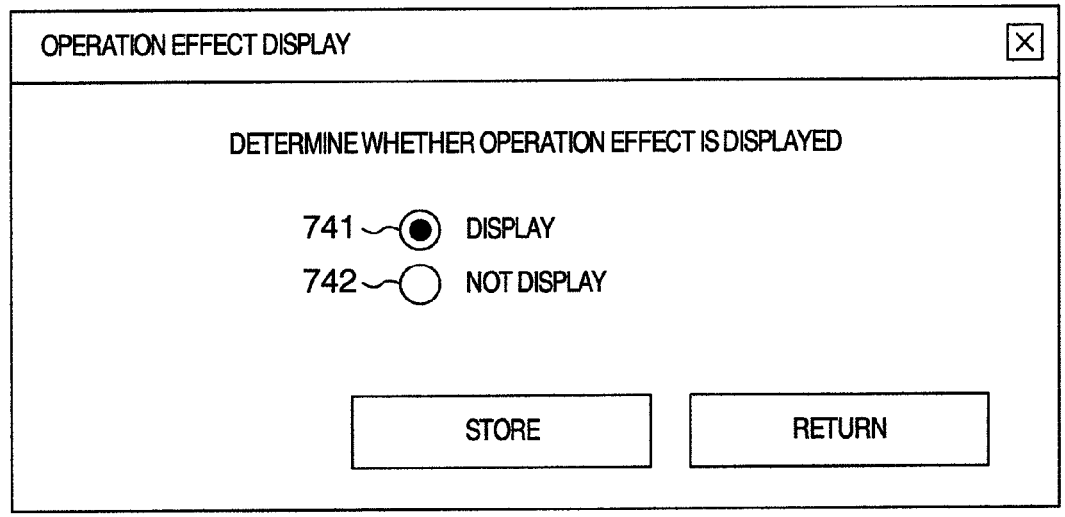
FIG. 10 shows a screen displayed on the image display apparatus when it is judged whether an operation effect is displayed or not, in the plant control apparatus of the present invention.
Figure 11:
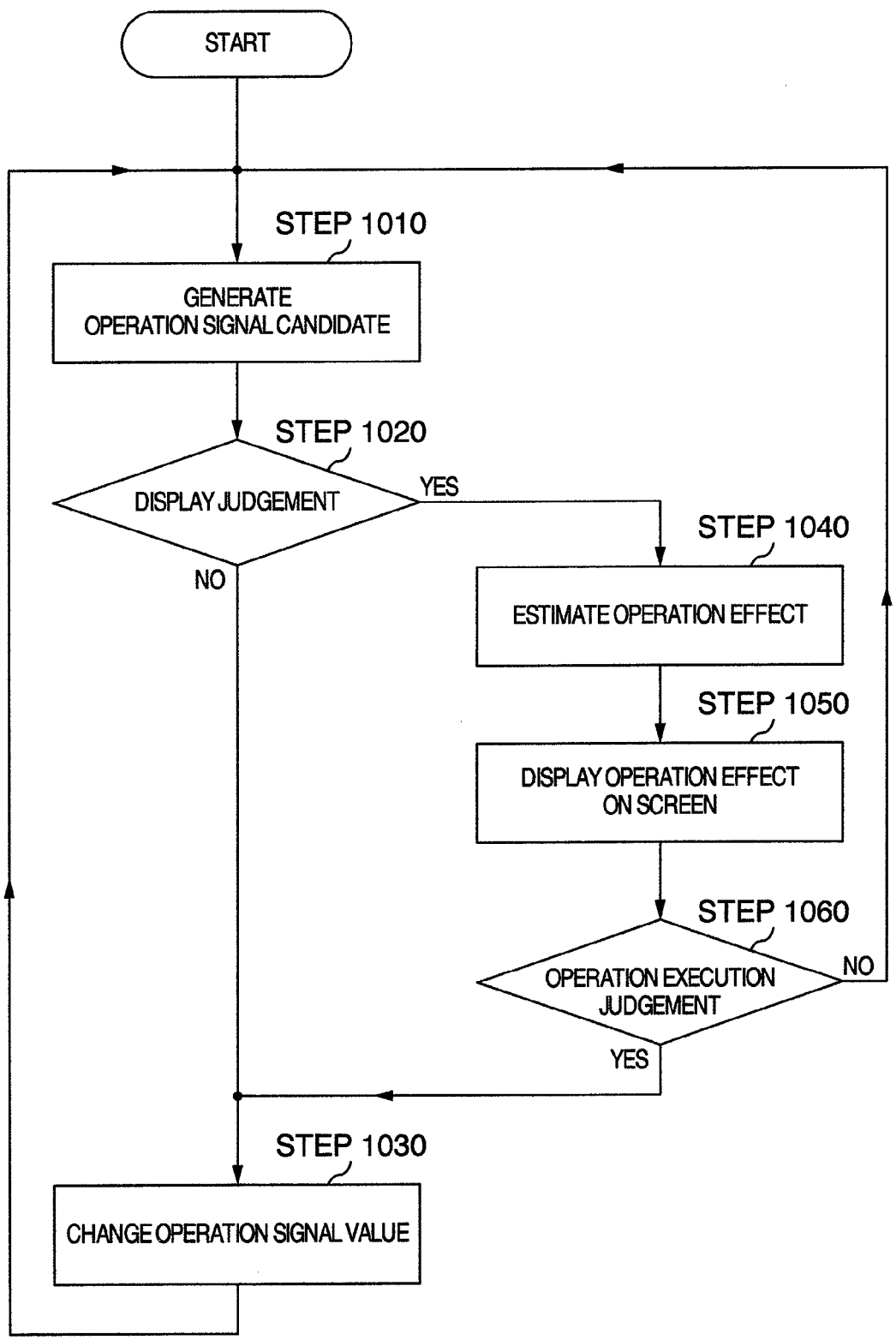
FIG. 11 is a flow chart illustrating an operation of the plant control apparatus of the present invention.

In FIG. 10, each time the operation signal for operating the plant 100 is changed, the signal analyzing unit 320 can be operated, and it is possible to select whether the effect of changing the operation signal is to be displayed on the image display apparatus 650. With reference to FIG. 11, description will be made on a selection difference between buttons 741 and 742.

FIG. 11 is a flow chart illustrating the operation of the control apparatus 200. The control operation of the control apparatus 200 is performed by a combination of Steps 1010, 1020, 1030, 1040, 1050 and 1060.

At Step 1010, the operation signal generating unit 280 is operated to generate a next operation signal candidate. Display judgment is performed at Step 1020. If the button 741 is selected in FIG. 10, the flow advances to Step 1040, whereas if the button 742 is selected, the flow advances to Step 1030.

At Step 1040, the operation signal evaluation functional block of the signal analyzing unit 320 is operated to estimate the effect of changing the operation signal. At Step 1050, the operation effect is displayed on the image display apparatus 650.

Figure 12:
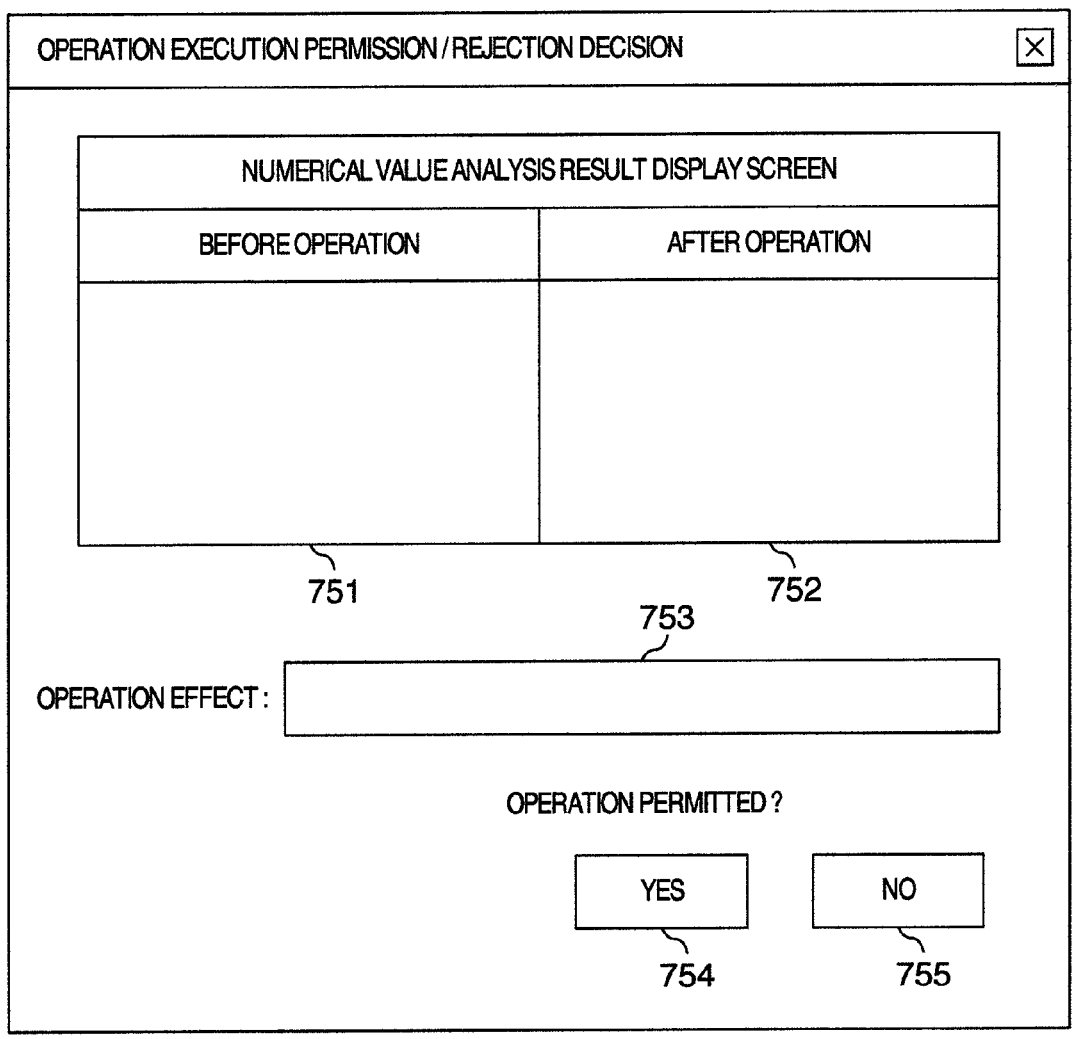
FIG. 12 shows a screen displayed on the image display apparatus when it is judged whether an operation is performed or not, in the plant control apparatus of the present invention.

FIG. 12 shows an embodiment of a screen displayed on the image display apparatus 650 at Step 1050. Two numerical value analysis results corresponding to before and after the operation are displayed at 751 and 752, respectively. The knowledge explaining a difference between two numerical value analysis results is displayed in a column 753. While viewing this information, an operator of the plant can judge whether the operation is to be performed. If the operation is to be permitted, a button 754 is selected, whereas if not, a button 755 is selected.

Step 1060 in FIG. 11 is an operation execution judgment step. If the button 754 is selected in FIG. 12, the flow advances to Step 1030, whereas if the button 755 is selected, the flow returns to Step 1010.

At Step 1030, the operation signal generated at Step 1010 is supplied to the plant 100.

Second Embodiment

Next, description will be made on the second embodiment when the plant control apparatus of the present invention is applied to a thermal power plant.

It is obvious that the plant control apparatus can be used when a plant other than a thermal power plant is to be controlled.

Figure 13:
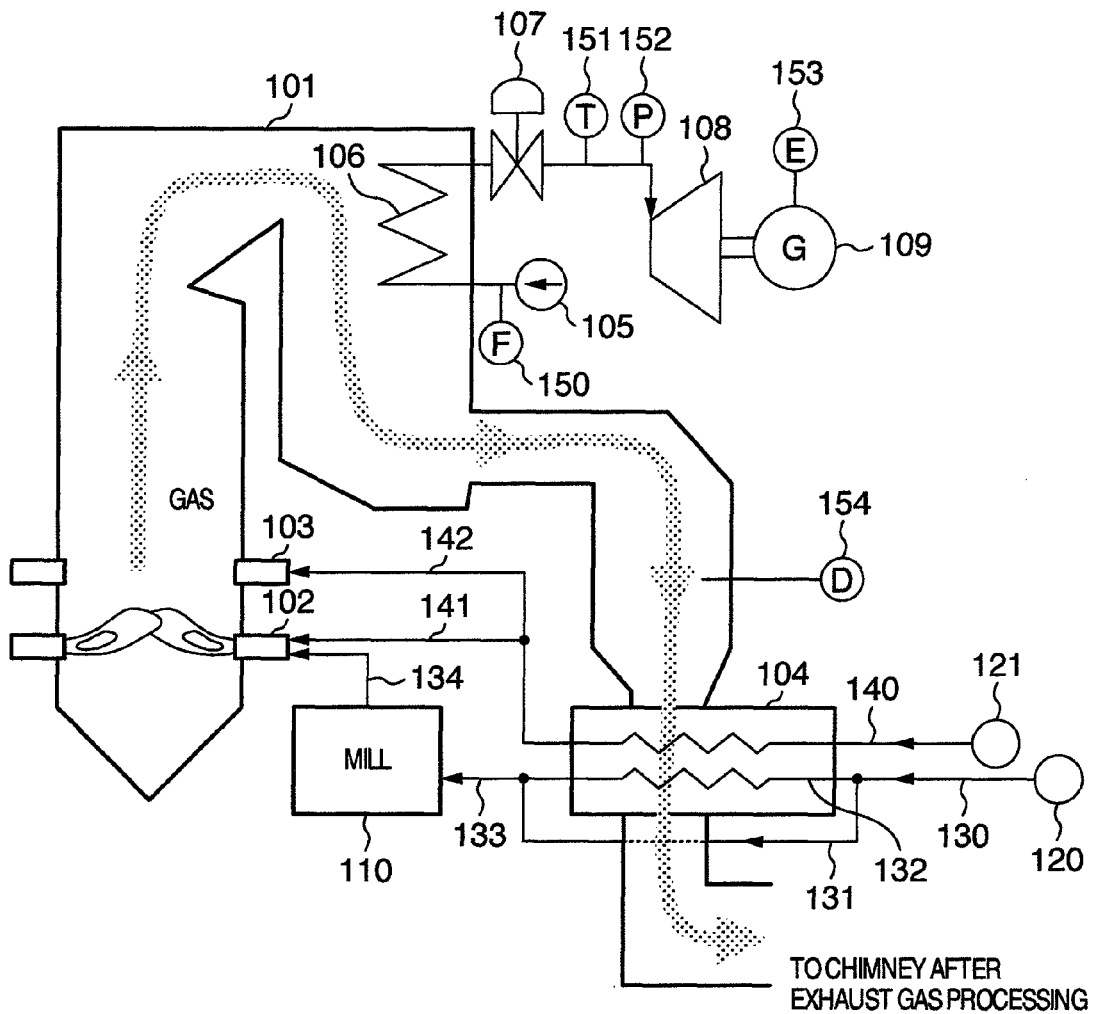
FIG. 13 is a diagram showing an example of the system structure of a thermal power plant to which the present invention is applied.

FIG. 13 is a diagram showing the system configuration of a thermal power plant 100.

A boiler 101 constituting the thermal power plant has burners 102 for supplying a fuel of fine powder coal formed by finely crashing coal in a mill 110, primary air for transporting fine powder coal, and secondary air for combustion adjustment. The fine powder coal supplied via the burners 102 is burnt in the boiler 101. The fine powder coal and primary air are guided via a pipe 134 to the burners 102, and the secondary air is guided via a pipe 141 to the burners 102.

The boiler 101 is equipped with after-air ports 103 for introducing two-stage combustion after-air to the boiler 101. The after-air is guided via a pipe 142 to the after-air ports 103.

High temperature combustion gas generated by combustion of the fine powder coal flows toward the downstream side along an inner path of the boiler 101, passes through a heat exchanger 106 disposed in the boiler 101 for heat exchange, and thereafter passes through an air heater 104. Gas passed through the air heater 104 is subjected to an exhaust gas process, and thereafter discharged to the atmospheric air via a chimney.

Water supplied via a water supply pump 105 to the heat exchanger 106 of the boiler and circulating in the heat exchanger 106 is heated excessively at the heat exchanger 106 by the combustion gas flowing toward the downstream side in the boiler 101, and transformed into high temperature and high pressure steam. In this embodiment, although one heat exchanger is used, a plurality of heat exchangers may be disposed.

The high temperature and high pressure steam passed through the heat exchanger 106 is guided via a turbine governor 107 to a steam turbine 108 which is driven by energy of the steam and makes a generator 109 generate an electric power.

Various instruments are disposed in the thermal power plant to detect the running states of the thermal power plant. Measurement signals measured by the instruments at the plant are transmitted to the control apparatus 200 as the measurement signal 1. The instruments shown in FIG. 13 include a flow rate meter 150, a temperature meter 151, a pressure meter 152, an output power meter 153 and a density meter 154.

The flow rate meter 150 measures the flow rate of water supplied from the water supply pump 105 to the boiler 101. The temperature meter 151 and pressure meter 152 measure a temperature and pressure of steam supplied from the heat exchanger 106 to the steam turbine 108.

An electric power generated by the generator 109 is measured with the output power meter 153. The density meter 154 disposed on the downstream side of the boiler 101 can measure information on the densities of compositions (CO, NOx and the like) contained in the combustion gas passing through the boiler 101.

Although a number of instruments other than those shown in FIG. 13 are generally disposed in the thermal power plant, those instruments are omitted in FIG. 13.

Next, description will be made on the paths of primary and secondary air introduced into the boiler 101 via the burners 102 and the path of the after-air introduced via the after-air ports 103.

The primary air is guided from a fan 120 into a pipe 130, branched intermediately into a pipe 132 passing through the air heater 104 disposed on the downstream side of the boiler 101 and a pipe 131 not passing through the air heater, again mixed in a pipe 133, and guided to the mill 110 disposed on the upstream side of the burners 102.

Air passing through the air heater 104 is excessively heated by the combustion gas flowing downstream in the boiler 101. By using this primary air, the fine powder coal crashed in the mill 110 is transported to the burners 102 along with the primary air.

The secondary air and after-air are guided from a fan 121 to a pipe 140, heated similarly in the air heater 104, thereafter branched into a secondary air pipe 141 and an after-air pipe 142, and guided to the burners 102 and after-air ports 103, respectively.

Figure 14:
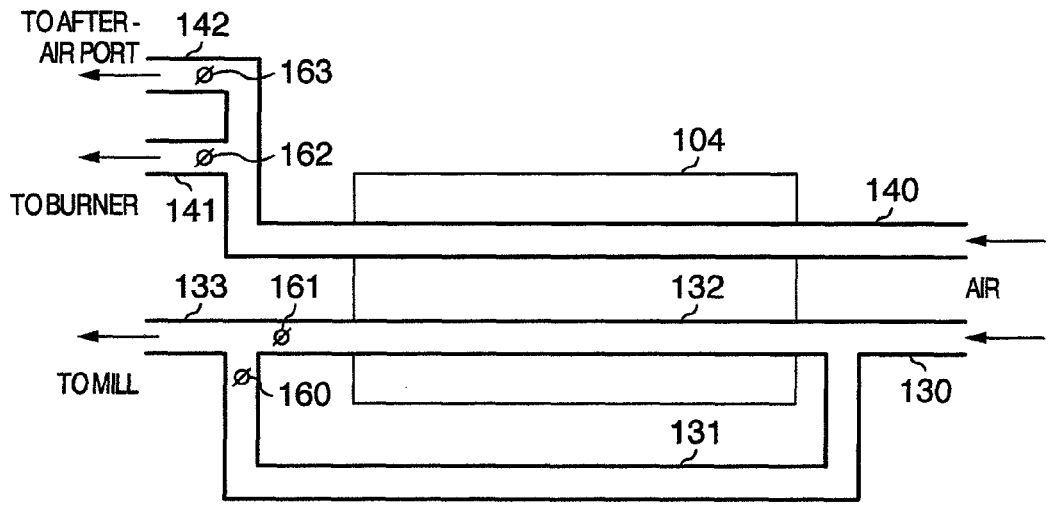
FIG. 14 is a diagram showing the structure of air heaters and pipes of the thermal power plant.

FIG. 14 is a diagram showing the structure of the air heater and pipes of the thermal power plant shown in FIG. 13. The pipes 131, 132, 141 and 142 are provided with air dumpers 160, 161, 162, and 163, respectively. By controlling these air dumpers, the areas of the pipes 131, 132, 141 and 142 through which air passes can be adjusted. It is therefore possible to adjust independently the amount of air passing through each of the pipes 131, 132, 141 and 142.

The machines including the water supply pump 105, mill 110, air dumpers 160, 161, 162 and 163, and the like can be operated by using the operation signal 15 generated by the control apparatus 200. In this embodiment, the machines including the water supply pump 105, mill 110, air dumpers 160, 161, 162 and 163, and the like are called operation terminals, and a command signal necessary for operating the operation terminals is called an operation signal.

A function capable of moving up, down, right and left an injection angle of air for combustion and a fuel of the fine powder coal to be introduced into the boiler 101 may be added to the burners 102 and after-air ports 103, and the injection angle may be included in the operation signal 15.

FIG. 15 is a diagram showing the format of data stored in the measurement signal database 210 and operation signal database 250. The value of each signal and its unit are time sequentially stored in the measurement signal database 210 and operation signal database 250. This information can be displayed on the image display apparatus 650 by selecting the buttons 721 and 722 shown in FIG. 8.

FIG. 16 shows a setting screen for numerical value analysis conditions for the numerical value analysis executing unit 220. This screen is displayed on the image display apparatus 650 when the button 711 in FIG. 7 is selected. The operation conditions of the plant 100 are entered in the screen of FIG. 16. R_0001 shown in FIG. 16 is a number assigned to distinguish the analysis conditions. FIG. 16 shows input unit of five types of analysis conditions R_0001 to R_0005. Although five analysis conditions can be input in FIG. 16, the number of analysis conditions may be increased.

After the analysis conditions are input in the screen of FIG. 16 and as the button 712 of FIG. 7 is selected, the numerical value analysis executing unit 220 executes a numerical value analysis corresponding to the operation conditions in FIG. 16.

FIG. 17 is a diagram showing the format of data stored in the numerical value analysis result database 240. The numerical value analysis result database 240 stores the analysis conditions input in the screen of FIG. 16 and the corresponding numerical value analysis results by the numerical value analysis executing unit 220. The items set by an operator can be displayed as the numerical value analysis results. If data described in the column of a data file name is referred to, three-dimensional numerical value analysis result can also be known. In FIG. 17, although a CO density and an NOx density are displayed, other items such as a steam temperature and a gas temperature can also be displayed.

Figure 18A:
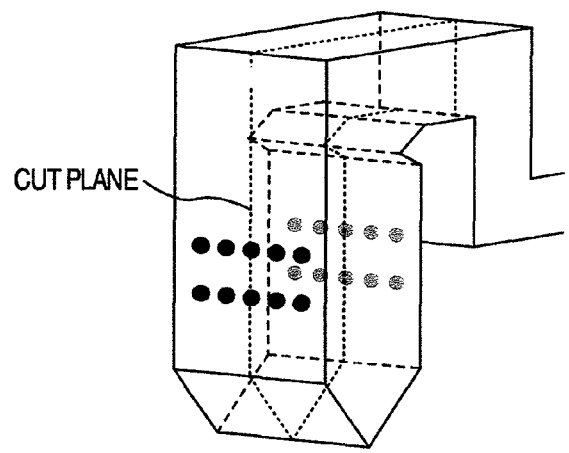
FIG. 18A is a diagram showing information stored in the numerical value analysis result database, when the plant control apparatus of the present invention is applied to the thermal power plant.
Figure 18B:
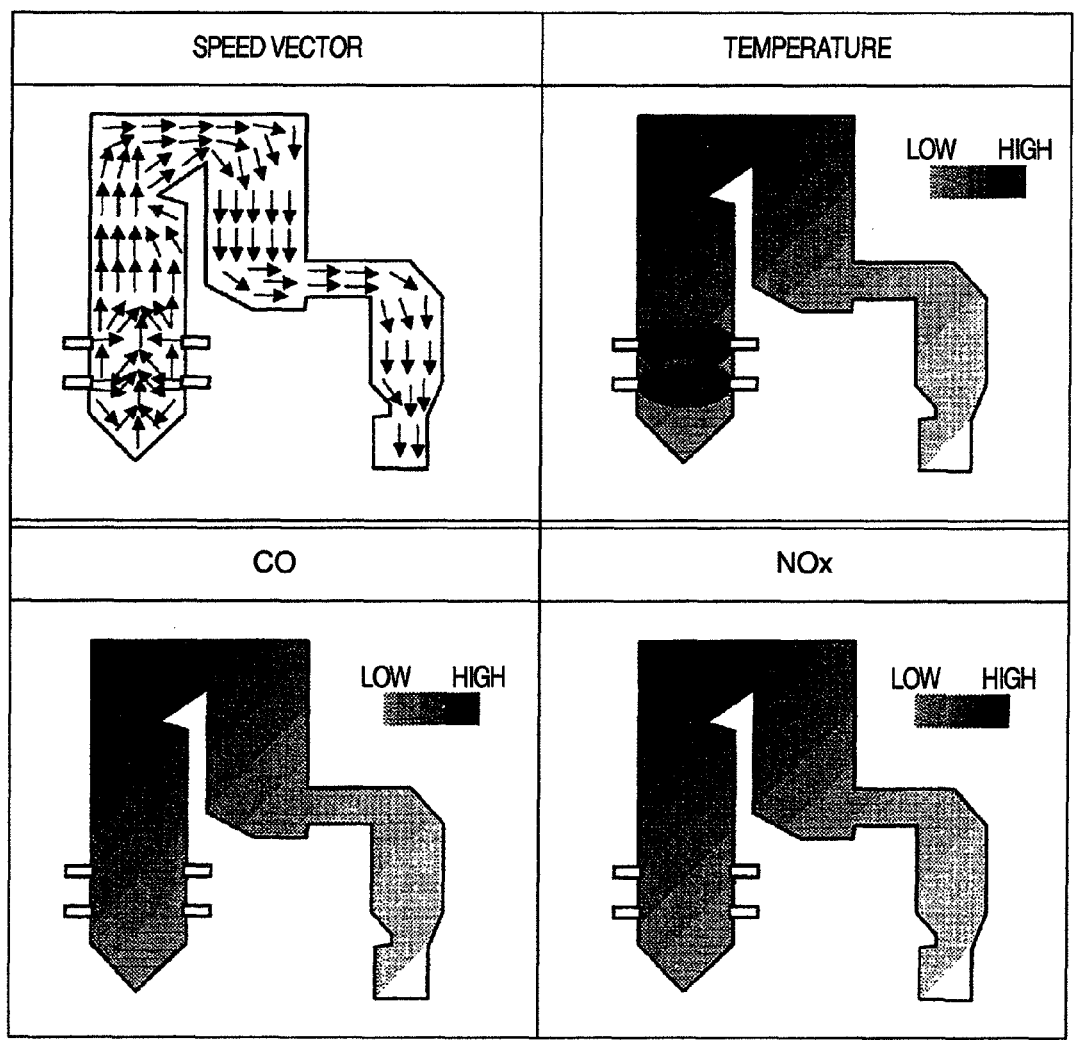
FIG. 18B is a diagram showing information stored in the numerical value analysis result database, when the plant control apparatus of the present invention is applied to the thermal power plant.

FIG. 18A shows three-dimensional numerical value analysis results stored in the numerical value analysis result database 240. FIG. 18B shows a speed vector, temperature, CO density and NOx density of gas at a cross section passing the third column burner and after-air port among the burners and after-air ports disposed laterally in the boiler 101 at the five columns.

The numerical value analysis results at an arbitrary cross section can be displayed on the image display apparatus 650.

Figure 19:
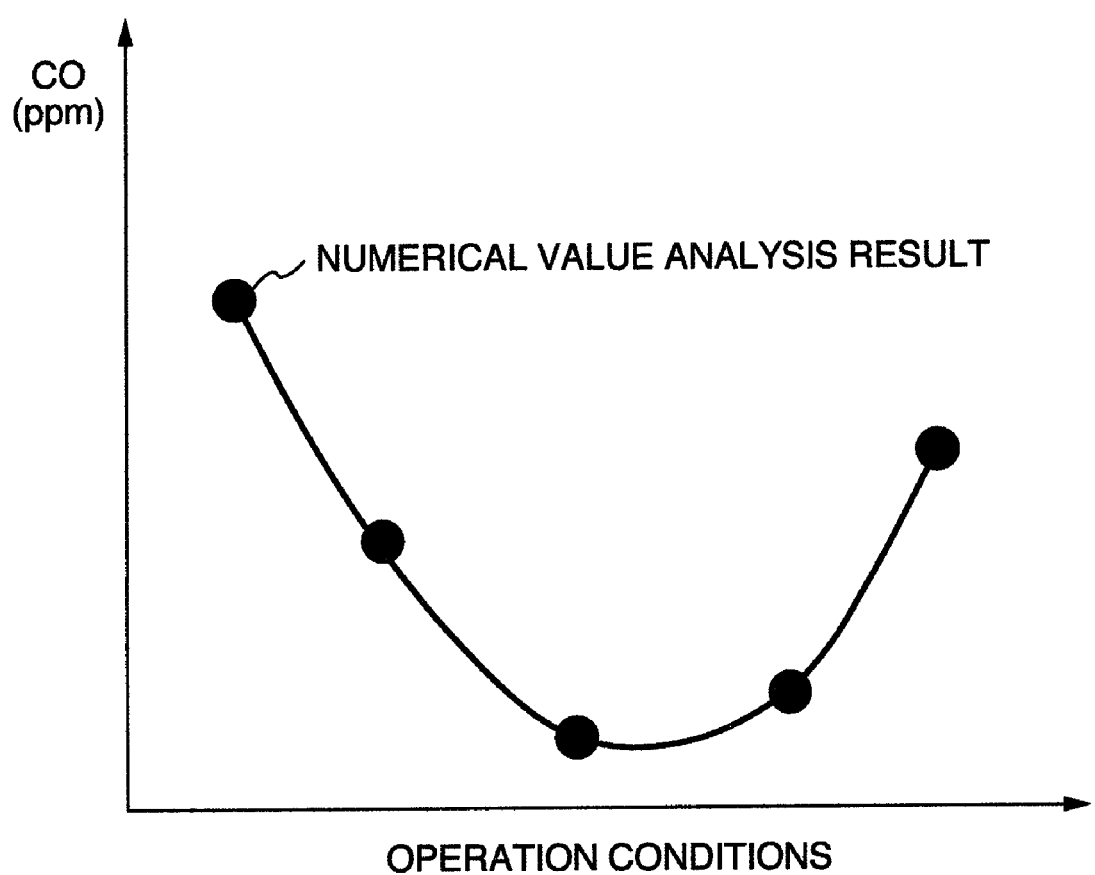
FIG. 19 is a diagram illustrating a model configuring method, when the plant control apparatus of the present invention is applied to the thermal power plant.

FIG. 19 is a diagram showing the characteristics of the model 230 configured in accordance with the numerical value analysis results in the numerical value analysis result database 240. The model 230 interpolates the numerical value analysis results in the numerical value analysis result database 240. Interpolation can use various methods such as a neural network.

If the control apparatus 200 is applied to a thermal power plant to reduce CO, the model 230 functions as a model which interpolates CO numerical value analysis results. Since calculations by the numerical value analysis executing unit 220 use a three-dimensional model as an object, a calculation time becomes long. In order to perform learning in a short time, it is necessary to obtain the numerical value analysis results corresponding to the model input 7 in a short time.

To this end, according to the embodiment, numerical value analysis results corresponding to a plurality of analysis conditions are stored in the numerical value analysis result database 240, and the numerical value analysis results are interpolated to configure a CO density calculation model in a short time.

FIG. 20 shows the format of information stored in the learning information database 270. The learning information database stores a running state and a value of an operation amount change width of the corresponding running state. In FIG. 20, S_0001 is a number assigned for distinguishing a running state.

FIGS. 21A, 21B and 21C show the formats of information stored in the knowledge database 400. The knowledge database 400 stores information in three formats including A, B and C types.

The type A stores knowledge regarding the influence upon a plant performance factor. The knowledge includes a position of gas passing through the boiler, a gas temperature and a gas flow rate at the position, a gas composition in weight or density of at least one of fine particles including nitrogen oxide, carbon monoxide, carbon dioxide, sodium oxide, mercury, fluorine, dust, mist and the like and volatile organic compound, respectively at a boiler output port, a boiler running efficiency, and the like.

The type B stores knowledge regarding the effect obtained by changing the operation signal.

The type C stores a measurement signal, an estimated factor of making large an error of the numerical value analysis result, and the analysis conditions for confirming the estimated factor. If an error is large, there is a possibility that the plant is operated in an abnormal state. The type C also stores a countermeasure for recovery from the abnormal state and the analysis conditions of performing numerical value analysis assuming that the countermeasure is executed.

FIG. 22 is a diagram showing the format of information stored in the analysis result database 500. The analysis result database 500 stores operation contents, effect estimation, improvement probability, estimated factor, reference diagram and past results.

Figure 23:
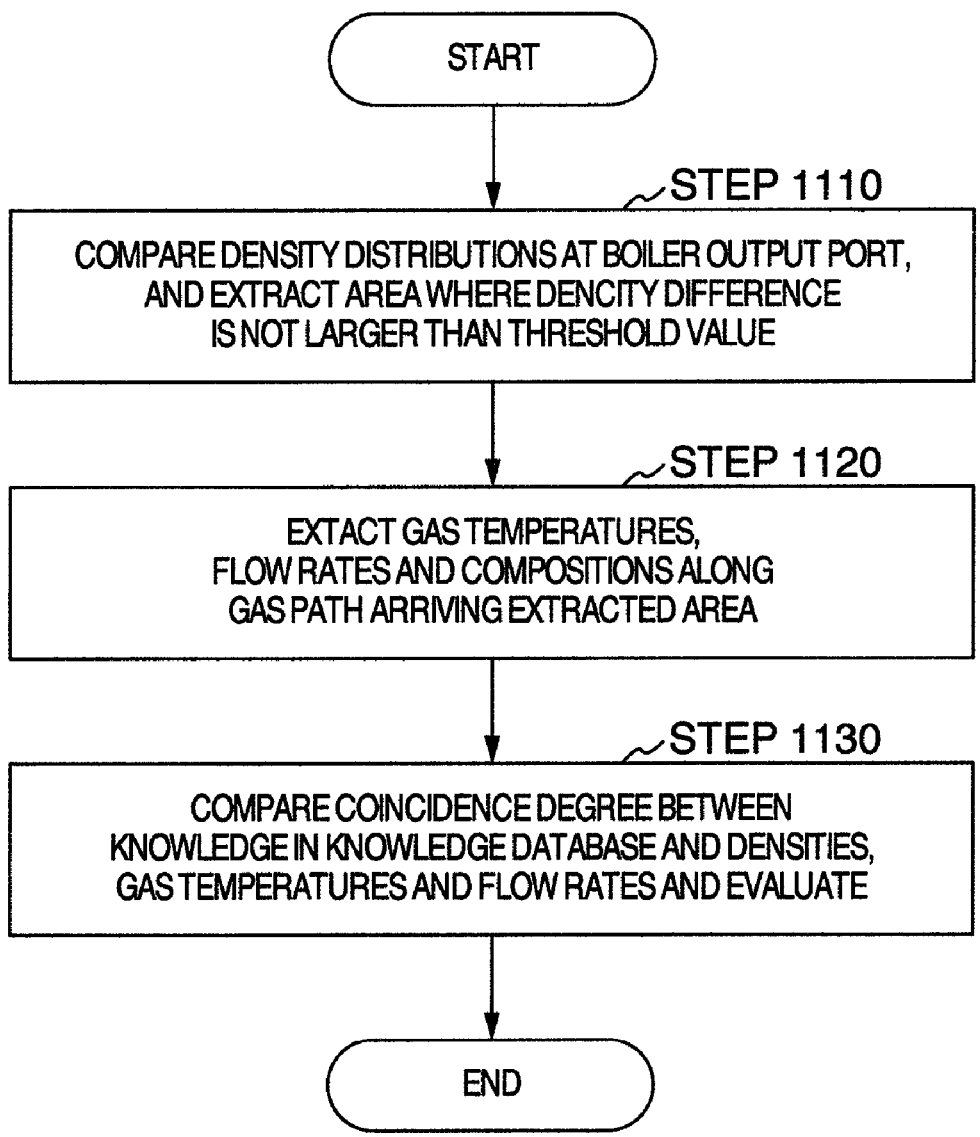
FIG. 23 is a diagram showing information stored in a learning base database, when the plant control apparatus of the present invention is applied to the thermal power plant.

FIG. 23 is a flow chart illustrating the details of Step 2040 of FIG. 3 illustrating the operation of the learning base analyzing unit 310, when the control apparatus of the present invention is applied to the thermal power plant. This operation is performed by executing a combination of Steps 1110, 1120 and 1130.

At Step 1110 the gas density distributions of CO, NOx and the like at the boiler output port are compared by using the two numerical value analysis results extracted at Step 2030, and an area where the density deviation is not smaller than a threshold value is extracted. At Step 1120 the gas path reaching the area extracted at Step 1110 is traced in the direction opposite to the gas flow to extract information on gas temperatures and gas flow rates along the gas path. At Step 1130 the knowledge of the type A in the knowledge database 400 is compared with the extracted gas densities/gas temperatures/gas flow rates to thereby evaluate whether the contents of the knowledge in the knowledge database 400 are coincident with the numerical analysis results.

Figure 24:
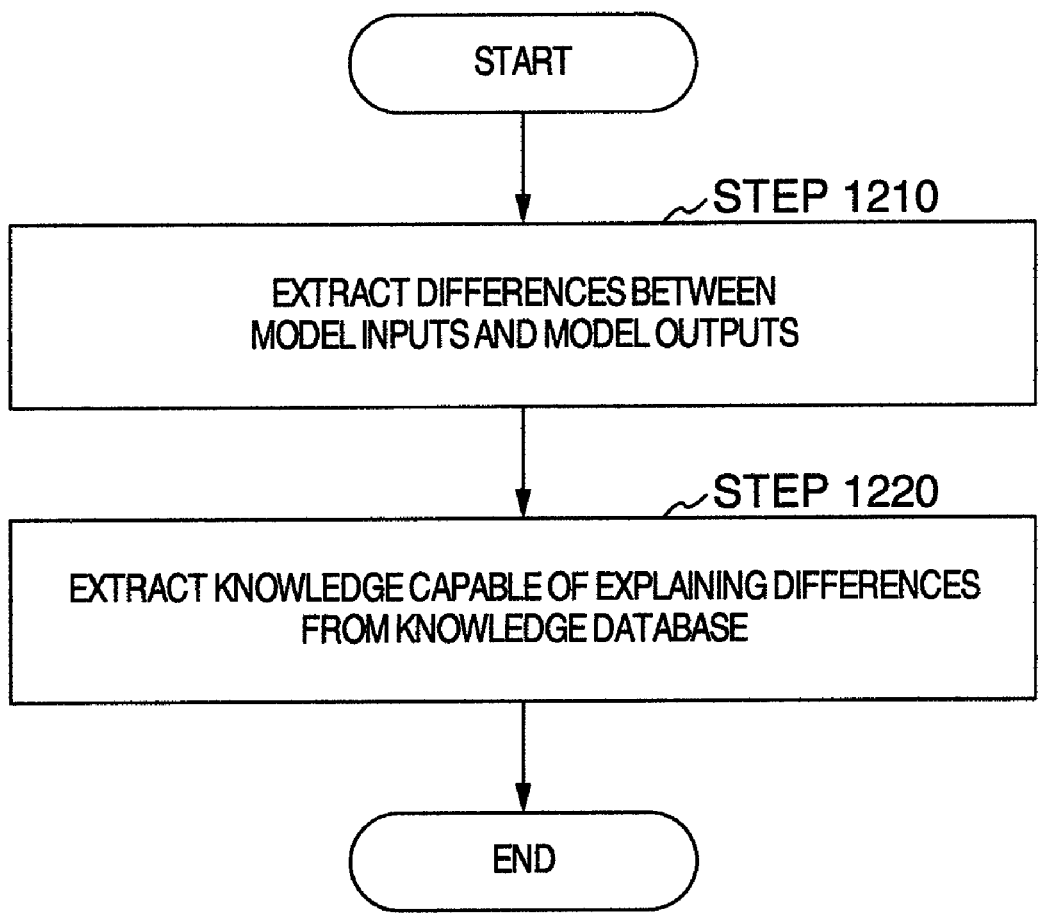
FIG. 24 is a flow chart illustrating the operation of one unit of an operation signal evaluation function constituting a signal analyzing unit, when the plant control apparatus of the present invention is applied to the thermal power plant.

FIG. 24 is a flow chart illustrating the details of Step 2130 of FIG. 4 illustrating the operation of the signal analyzing unit 320, when the control apparatus of the present invention is applied to the thermal power plant. This operation is performed by executing a combination of Steps 1210 and 1220.

At Step 1210 differences between two model inputs and corresponding two model outputs extracted at Steps 2110 and 2120 are extracted. Next, at Step 1220 the knowledge capable of explaining the differences extracted at Step 1210 is extracted from the knowledge of the type B in the knowledge database 400.

Figure 25:
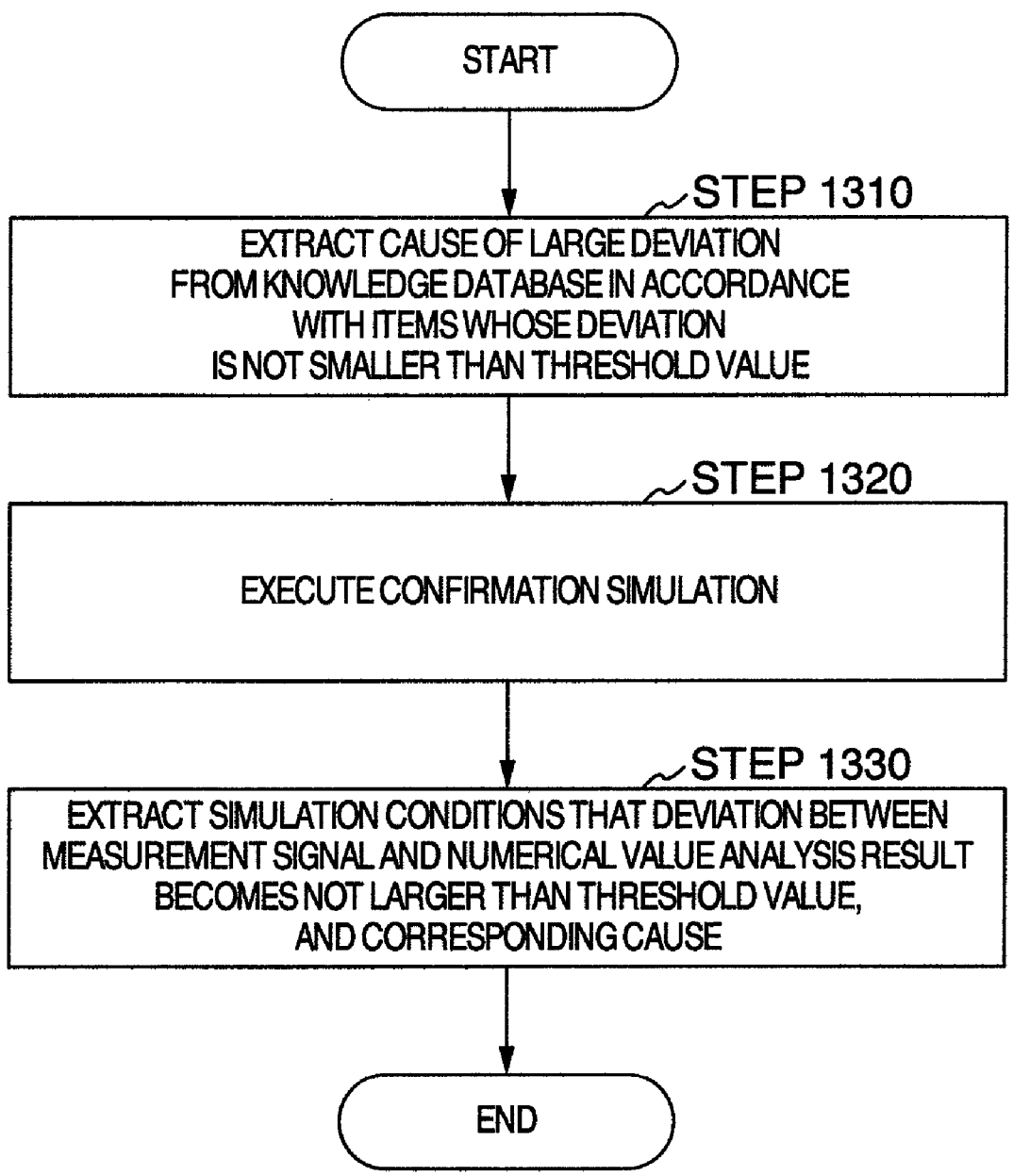
FIG. 25 is a flow chart illustrating the operation of one unit of a measurement signal evaluation function constituting a signal analyzing unit, when the plant control apparatus of the present invention is applied to the thermal power plant.

FIG. 25 is a flow chart illustrating the details of Step 2250 of FIG. 4 illustrating the operation of the signal analyzing unit 320, when the control apparatus of the present invention is applied to the thermal power plant. This operation is performed by executing a combination of Steps 1310, 1320 and 1330.

For the item having the deviation not smaller than the threshold value at Step 2240, the cause of the large deviation is extracted from the knowledge of the type C in the knowledge database 400 at Step 1310. At Step 1320 confirmation simulation is executed. At Step 1330 the numerical value analysis result obtained through execution at Step 1320 is compared with the measurement signal, to extract the simulation conditions that the deviation becomes not larger than the threshold value and the corresponding cause.

Figure 26:
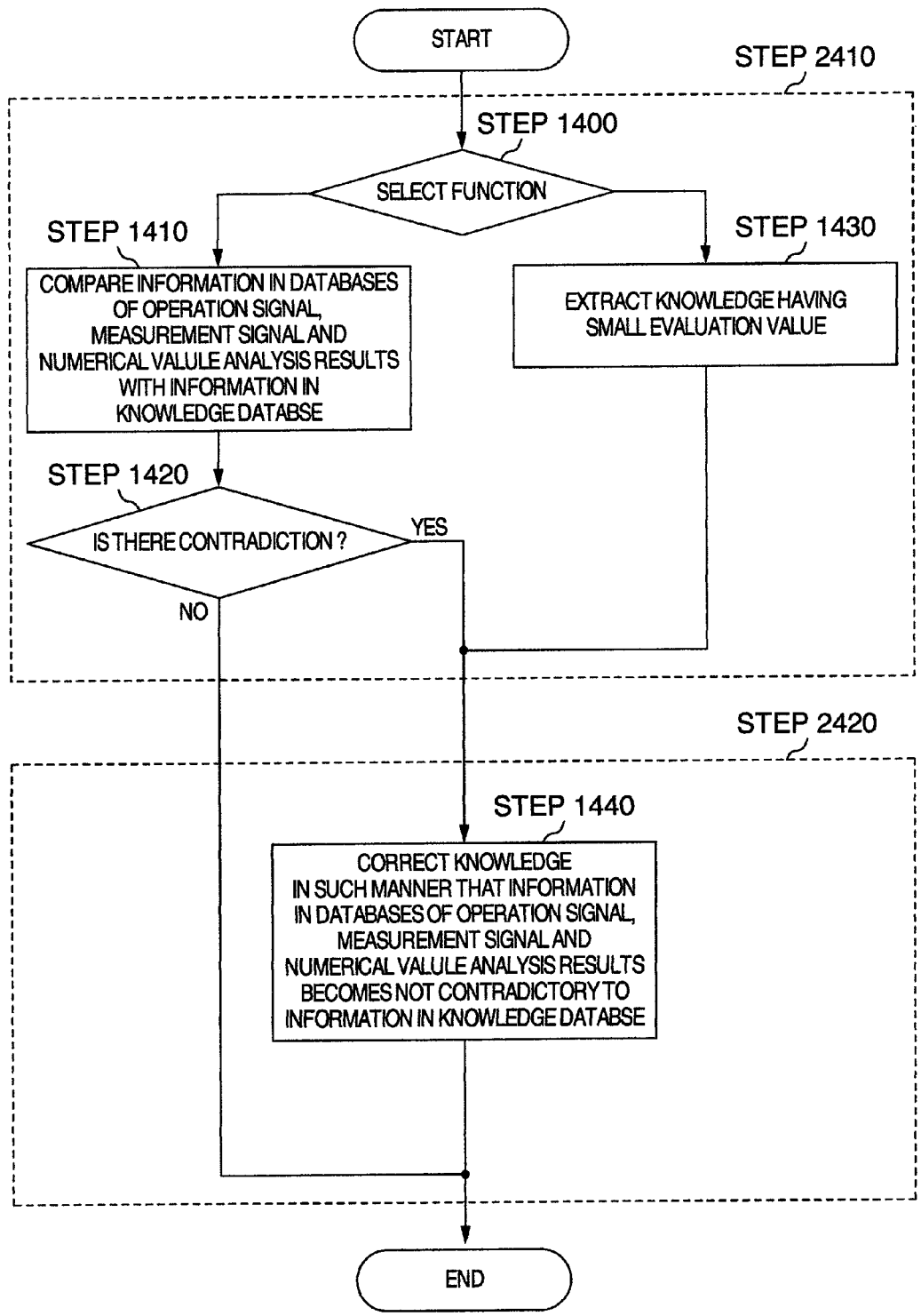
FIG. 26 is a flow chart illustrating the operation of one unit of a knowledge modifying function constituting a knowledge database updating unit, when the plant control apparatus of the present invention is applied to the thermal power plant.

FIG. 26 is a flow chart illustrating the details of Steps 2410 and 2420 of FIG. 5 illustrating the operation of the knowledge database updating unit 330, when the control apparatus of the present invention is applied to the thermal power plant. This operation is performed by executing a combination of Steps 1400, 1410, 1420, 1430 and 1440.

In this embodiment, there are two types of the methods of selecting the knowledge to be corrected at Step 2410, i.e., selecting at Steps 1410 and 1420 the knowledge to be corrected and selecting at Step 1430 the knowledge to be corrected.

At Step 1410 the information in the measurement signal database 210, operation signal database 250 and numerical value analysis result database 240 is compared with the knowledge of the type A in the knowledge database 400. If the comparison result at Step 1410 is contradictory, the flow advances from Steep 1420 to Step 1440, whereas if not contradictory, it is judged that correction is not necessary and the operation is terminated. At Step 1430 the knowledge having a low evaluation value is extracted from the knowledge in the knowledge database 400, and is used as the knowledge to be corrected. At Step 1440 the knowledge is corrected in such a manner that the information in the measurement signal database 210, operation signal database 250 and numerical value analysis result database 240 becomes not contradictory to the knowledge of the type A in the knowledge database 400. More specifically, the quantitative values of the information in the knowledge database 240 are corrected to the values capable of explaining all the values in the measurement signal database 210, operation signal database 250 and numerical value analysis result database 240.

Figure 27:
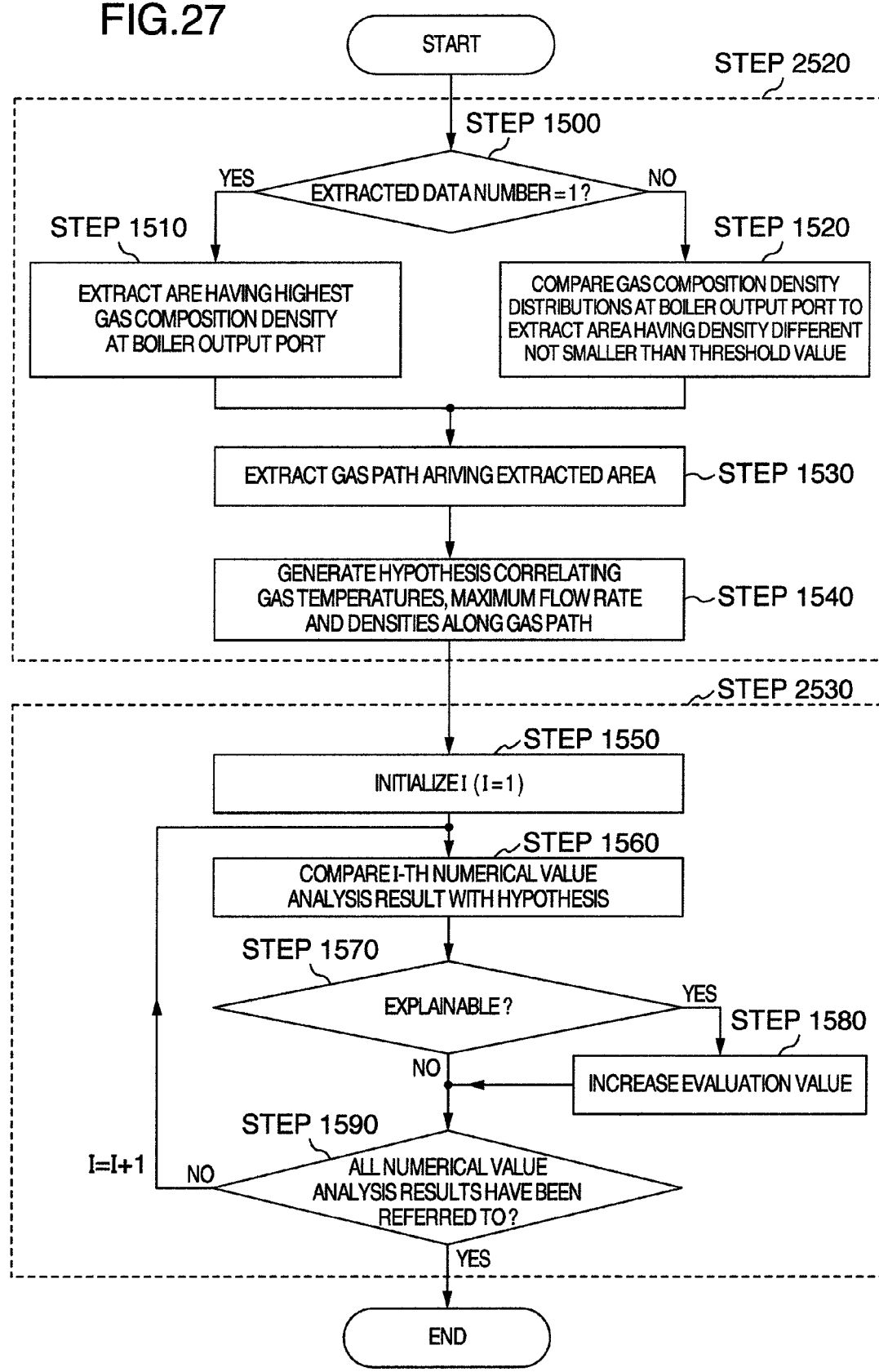
FIG. 27 is a flow chart illustrating the operation of one unit of a knowledge adding function constituting the knowledge database updating unit, when the plant control apparatus of the present invention is applied to the thermal power plant.

FIG. 27 is a flow chart illustrating the details of Steps 2520 and 2530 of FIG. 5 illustrating the operation of the knowledge database updating unit 330, when the control apparatus of the present invention is applied to the thermal power plant. Step 2520 is executed by a combination of Steps 1500, 1510, 1520, 1530 and 1540. Step 2530 is executed by a combination of Steps 1550, 1560, 1570, 1580 and 1590.

Step 1500 of Step 2520 is a branch step on the basis of the number of numerical analysis results extracted at Step 2510. If one numerical value analysis result is extracted, the flow advances to Step 1510, and in other cases the flow advances to Step 1520. At Step 1510 an area having the highest gas composition density at the boiler output port is extracted. At Step 1520 two gas composition densities of the two numerical value analysis results at the boiler output port are compared to extract an area having a density difference not smaller than the threshold value. At Step 1530 a gas path arriving the area extracted at Step 1510 or 1520 is extracted. At Step 1540 a hypothesis is generated correlating the gas temperature, maximum gas flow rate and density along the gas path extracted at Step 1530. Namely, the hypothesis is generated in the formats of the type A shown in FIG. 21A and the type B shown in FIG. 21B.

Step 1550 of Step 2530 initializes I (I=1). At Step 1560 the I-th numerical value analysis result is compared with the hypothesis generated at Step 1540. If Step 1560 indicates that the hypothesis and the I-th numerical value analysis result are not contradictory, the flow advances from Step 1570 to Step 1580, whereas if contradictory, the flow advances to Step 1590. At Step 1580 an evaluation value of the hypothesis is increased. If it is judged at Step 1590 that all numerical value analysis results in the numerical value analysis result database 240 are not still referred to, 1 is added to I to thereafter return to Step 1560, whereas if all numerical value analysis results have been referred to, the operation is terminated. Thereafter, at Step 2540 if the evaluation value of the hypothesis is not smaller than the threshold value, the flow advances to Step 2550.

FIG. 28 shows an embodiment of a screen displayed on the image display apparatus 650 when the control apparatus of the present invention is applied to the thermal power plant, this screen corresponding to the screen shown in FIG. 12. Since simulation results before and after the operation can be displayed on one screen, the operation effect can be clarified. An operator of the plant can judge whether the operation is performed or not by viewing this screen.

FIG. 29 shows an embodiment of a screen displayed on the image display apparatus 650 when the control apparatus of the present invention is applied to the thermal power plant. The screen shows simulation results before and after the plant modification. Since the plant modification effects can be displayed on one screen by using the control apparatus of the present invention, the operator of the plant can make a decision quickly.

Next, with reference to FIGS. 30, 31A, 31B and 31C, description will be made on an example of the operation of the analyzing unit 300 when the control apparatus of the present invention is applied to the thermal power plant and the learning unit learns the method of controlling a carbon monoxide (CO) density.

Figure 30:
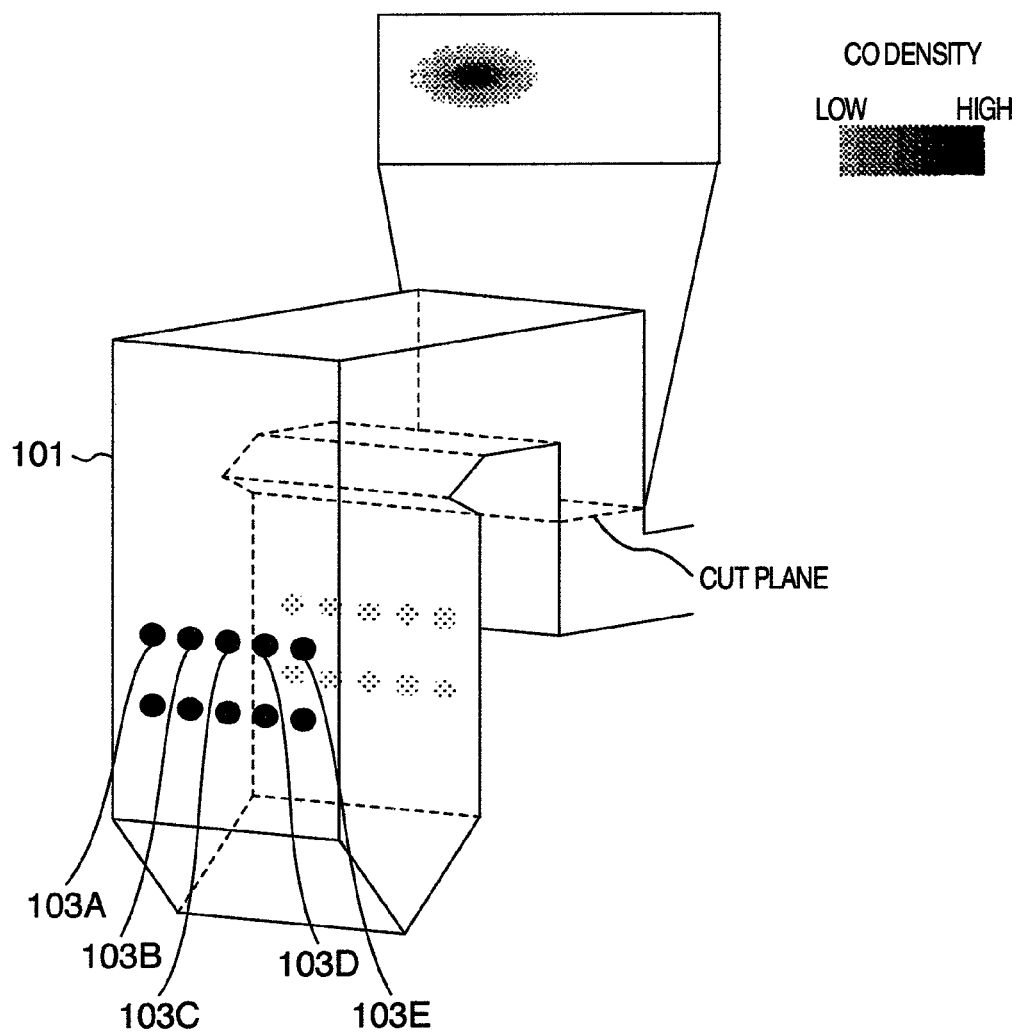
FIG. 30 is a distribution diagram of a CO density at a boiler output port obtained as numerical analysis results of a boiler constituting the thermal power plant.

FIG. 30 is a diagram showing a distribution of boiler output port CO densities as the result of numerical value analysis by the numerical value analysis executing unit 220, in the boiler constituting the thermal power plant. The result of the numerical value analysis result is stored in the numerical value analysis database 240.

A CO density distribution at the boiler output port cross section can be extracted from the information in the numerical value analysis result database 240. At Step 1110 shown in FIG. 23, Steps 1510 and 1520 and the like shown in FIG. 27, the gas composition densities at the boiler output port shown in FIG. 30 are extracted automatically. After-air ports 103 disposed laterally at five columns in the boiler 101 are represented by 103A, 103B, 103C, 103D and 103E, affixing A, B, C, D and E sequentially from the leftmost after-air port.

Figures 31A, 31B, 31C:
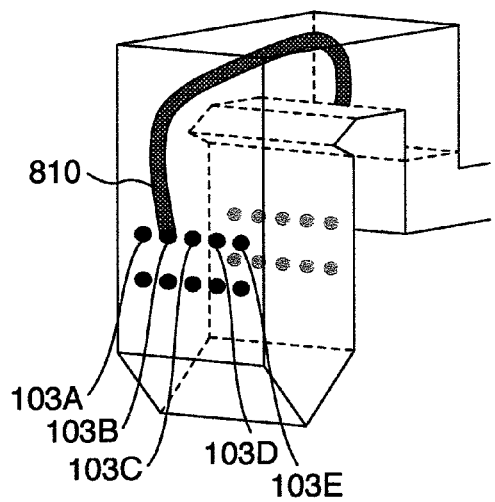
FIG. 31A is a diagram illustrating a comparison of numerical analysis results before and after an operation, when the plant control apparatus of the present invention is applied to the thermal power plant.
FIG. 31B is a diagram illustrating a comparison of numerical analysis results before and after an operation, when the plant control apparatus of the present invention is applied to the thermal power plant.
FIG. 31C is a diagram illustrating a comparison of numerical analysis results before and after an operation, when the plant control apparatus of the present invention is applied to the thermal power plant.

FIGS. 31A, 31B and 31C show comparisons of numerical value analysis results before and after the operation when the control apparatus of the present invention is applied to the thermal power plant, particularly indicating the details of the operation illustrated in FIG. 23.

FIG. 31A shows running conditions (operation command values) before and after an operation signal change, and corresponding numerical value analysis results.

The learning unit 260 learns the operation method by using the model matching FIG. 19. Although one type of the operation conditions is used in FIG. 19, the model in FIG. 31A uses five types of operation conditions. Therefore, as shown in FIG. 31A the method of increasing an air flow rate at the after-air port 103B and decreasing an air flow rate at the after-air ports 103D and 103E was learnt. A CO density at the boiler output port was therefore changed from 150 ppm to 100 ppm.

Although a conventional control apparatus can learn the method of changing an air flow rate at each after-air port, it cannot know a physical reason why a CO density lowers if the air flow rate is changed.

In the control apparatus of the present invention, the analyzing unit 300 can analyze the reason why a CO density lowers. The operation of the analyzing unit will be described with reference to the flow chart of FIG. 23.

As shown in FIG. 31A, at Step 1110 an area 800 having a large density change is extracted from the numerical value analysis results of CO densities at the boiler output port before and after the operation.

Next, as shown in FIG. 31B, at Step 1120 the gas speed vector is reversely traced from the area 800 extracted at Step 1110 to extract a path 810 of gas reaching the area 800. As shown in FIG. 31B it can therefore know that gas whose start point is the after-air port 103B reaches the area 800. As shown in FIG. 31C, an O2 density is automatically extracted along the gas path 810.

In the area having a low O2 density, coal is burnt incompletely so that CO is generated. As shown in FIG. 31C, the O2 density at the boiler output port is low before the operation so that CO is generated as shown in FIG. 31A. By increasing the air flow rate at the after-air port 103B, the phenomenon that the O2 density lowers at the boiler output port was avoided so that the CO density lowered.

The knowledge database 400 stores information in the formats shown in FIGS. 21A, 21B and 21C, and stores knowledge that CO is likely to generate if the O2 density is low. At Step 1130 shown in FIG. 23, the knowledge in the knowledge database 400 is compared with the numerical value analysis results shown in FIG. 31C. It can therefore automatically know that if the air flow rate at the after-air port 103B is increased, it is possible to avoid a lower O2 density so that the CO density can be lowered.

This analysis result is displayed on the image display apparatus 650 in the format shown in FIG. 28. An operator of the plant confirms the numerical value analysis results and the analysis result to judge whether the operation can be performed. If it is judged that the numerical value analysis results and the analysis result are not reliable, this operation input to the plant can be prevented. Namely, by incorporating a step of not only learning by the control apparatus 200 but also confirmation by the plant operator, the plant 100 can be operated more safely.

Analyzing the numerical value analysis results and learning results by a human being obtains the same result as the analysis result by the analyzing unit 300.

However, during plant running, there is no time to spare for the analysis by a human being, because it is necessary to judge at once whether the operation signal is to be changed or not. Therefore, the analyzing unit 300 of the control apparatus 200 of the present invention is an essential function to run the plant safely.

In analyzing the thermal power plant, the knowledge database 400 stores not only the knowledge regarding CO but also the knowledge regarding the gas composition in weight or density of at least one of fine particles including nitrogen oxide (NOx), carbon monoxide, carbon dioxide, sodium oxide, mercury, fluorine, dust, mist and the like and volatile organic compound, respectively at a boiler output port, and a plant running efficiency.

NOx includes fuel NOx generated by reaction of nitrogen content contained in coal and thermal NOx generated by reaction of nitrogen content contained in the atmospheric air. The thermal NOx in particular is generated in a high temperature area. If NOx at the boiler output port lowers by changing the operation signal, the reason why NOx was reduced can be analyzed by the method similar to the method described with reference to FIG. 23 and FIGS. 31A, 31B and 31C. Namely, the gas temperatures along the gas path reaching the area having a large NOx density change are shown as in FIG. 31C, and highest gas temperatures before and after the operation are compared. It is assumed in this case that the highest gas temperature becomes lower after the operation. This phenomenon unit that performing the operation can suppress a rise in a gas temperature, suppress the generation of thermal NOx, and reduce NOx at the boiler output port.

The analysis described above can be executed automatically by using the plant control apparatus of the present invention.

Third Embodiment

In the control apparatus for a plant having a boiler, the present invention has a phenomenon visualizing unit for visualizing a phenomenon in the boiler and displaying the relation between a control operation and the phenomenon occurring in the boiler, and an image displaying unit for displaying the relation visualized by the phenomenon visualizing unit on the screen.

The phenomenon visualizing unit has a stream line data calculating unit for learning the relation between input data and output data, by using the numerical value analysis results including at least a gas flow phenomenon in the boiler, using as the input data fuel at least fuel and air flow rates supplied to the burners and an air flow rate supplied to the air supply ports other than the burners, and using as the output data the position data of stream lines as the loci of gas flow supplied from the burners and air supply ports, and a stream line drawing unit for receiving the position data of the stream lines output from the stream line data calculating unit and displaying the position data as images on the display screen.

The image displaying unit displays on the screen the stream lines of gas visualized by the stream line drawing unit and supplied from the burners and air supply ports.

In addition to the stream line data calculating unit and stream line drawing unit, the phenomenon visualizing unit may further have one or both of a stream line data interpolating unit for interpolating discrete data of the stream line positions output from the stream line data calculating unit, and a condition adaptive data extracting unit for extracting stream line position data adaptive to the designated conditions, from the stream line position data output from the stream line data unit.

If the phenomenon visualizing unit has the stream line data calculating unit, stream line data interpolating unit, and stream line drawing unit, it is desired that the stream line data interpolating unit interpolates discrete data of the stream line positions output from the stream line data calculating unit and that the stream line drawing unit executes a calculation process for outputting the stream line position data output from the stream line data calculating unit and the stream line position data interpolated by the stream line data interpolating unit.

If the phenomenon visualizing unit has the stream line data calculating unit, condition adaptive data extracting unit, and stream line drawing unit, it is desired that the condition adaptive data extracting unit extracts stream line position data adaptive to the designated conditions from the stream line position data output from the stream line data calculating unit, and that the stream line drawing unit executes a calculation process for outputting the selected stream line position data to the display screen.

If the phenomenon visualizing unit has the stream line data calculating unit, condition adaptive data extracting unit, stream line data interpolating unit, and stream line drawing unit, it is desired that the condition adaptive data extracting unit extracts stream line position data adaptive to the designated conditions from the stream line position data output from the stream line data calculating unit, that the stream line data interpolating unit interpolates discrete data of the selected stream line position, and that the drawing unit executes a calculation process for drawing, as an image on the display screen, the data selected by the condition adaptive data extracting unit added to the interpolation data calculated by the stream line data interpolating unit.

The boiler plant control apparatus of the present invention may have a learning unit for learning the relation among at least information on the fuel and air flow rates to be supplied to the burners, information on some or the whole of the air flow rate to be supplied to the air supply ports other than the burners, and at least one value selected from a group consisting of a carbon monoxide density, an oxygen density, a nitrogen oxide density, a sulfur oxide density, a mercury density, a volatile organic compound density and a not-burnt fuel density, respectively at a predetermined position along the gas path in the boiler.

If the learning unit is provided, it is desired to input control command values for the fuel and air flow rates to be supplied to the burners and for some or the whole of the air flow rate to be supplied to the air supply ports other than the burners, determined in accordance with the learning results, to the already learnt stream line data calculating unit, to thereby output estimated values of the gas flow in the boiler.

The structure of the boiler plant control apparatus can be directly applied to a training apparatus for an operator in charge of boiler plant control.

Figure 32:
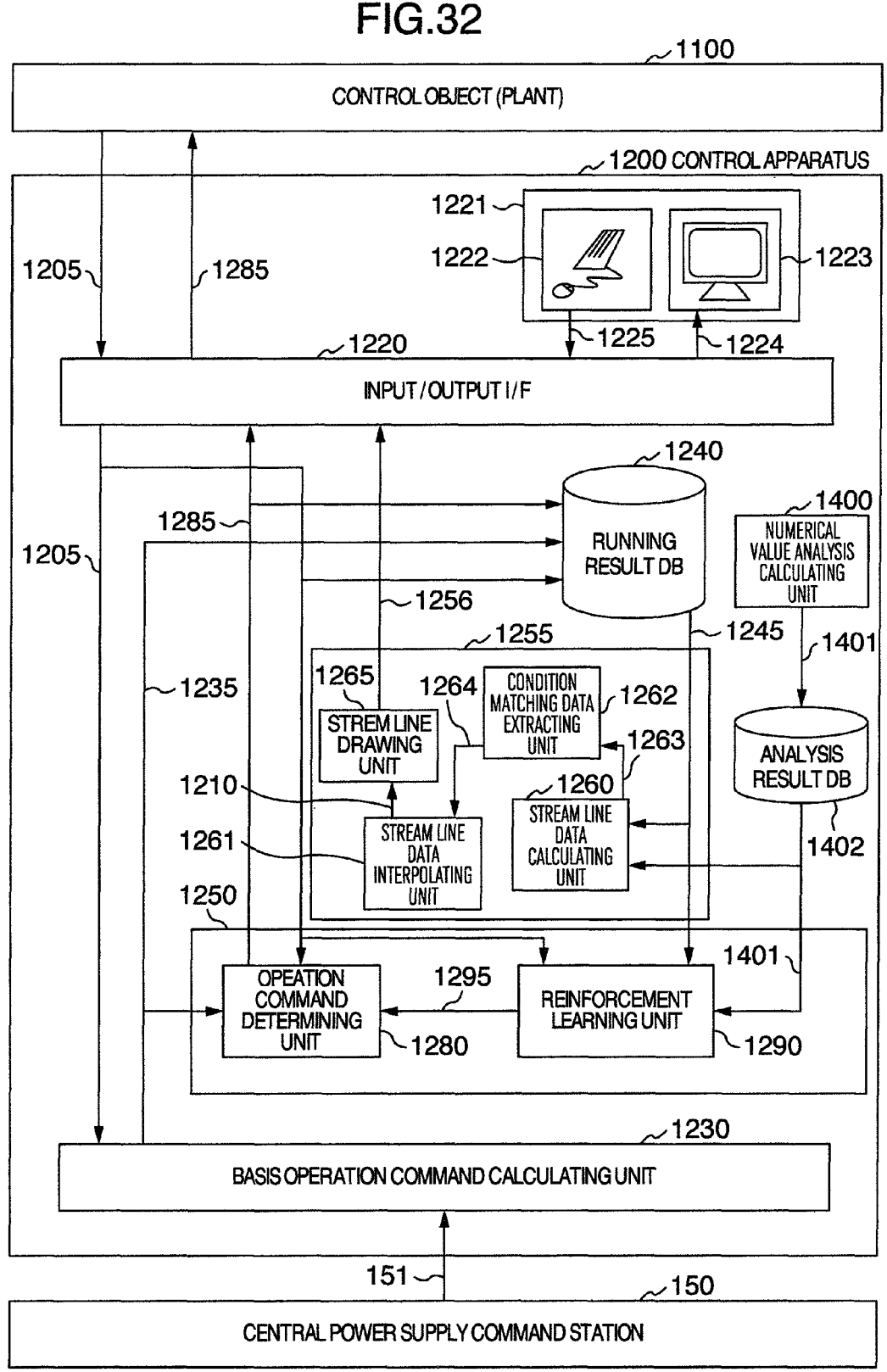
FIG. 32 is a diagram showing the structure of a control apparatus according to a mode for carrying out the present invention.

With reference to the accompanying drawings, description will be made on the best mode for carrying out the invention. FIG. 32 shows the best mode of the present invention. A control apparatus 1200 of the embodiment receives measurement information 1205 as process values from a plant 1100 to be controlled. The measurement information is calculated by a program provided in the control apparatus 1200 to transmit an operation command signal (hereinafter also called a control signal) 1285 as a control command value to the control object plant 1100. In accordance with the transmitted operation command signal 1285, the state of the plant is controlled by operating actuators such as setting the valve opening and dumper opening in the control object plant.

In accordance with a load command signal 1051 received from a central power supply station 1050, the control apparatus 1200 controls a power output of the control object plant 1100.

In this embodiment, the present invention is applied to combustion control of a thermal power plant. In this example, description will be made mainly on the case wherein the invention is applied to a control function of aiming to lower NOx and CO densities in exhaust gas.

Figure 33:
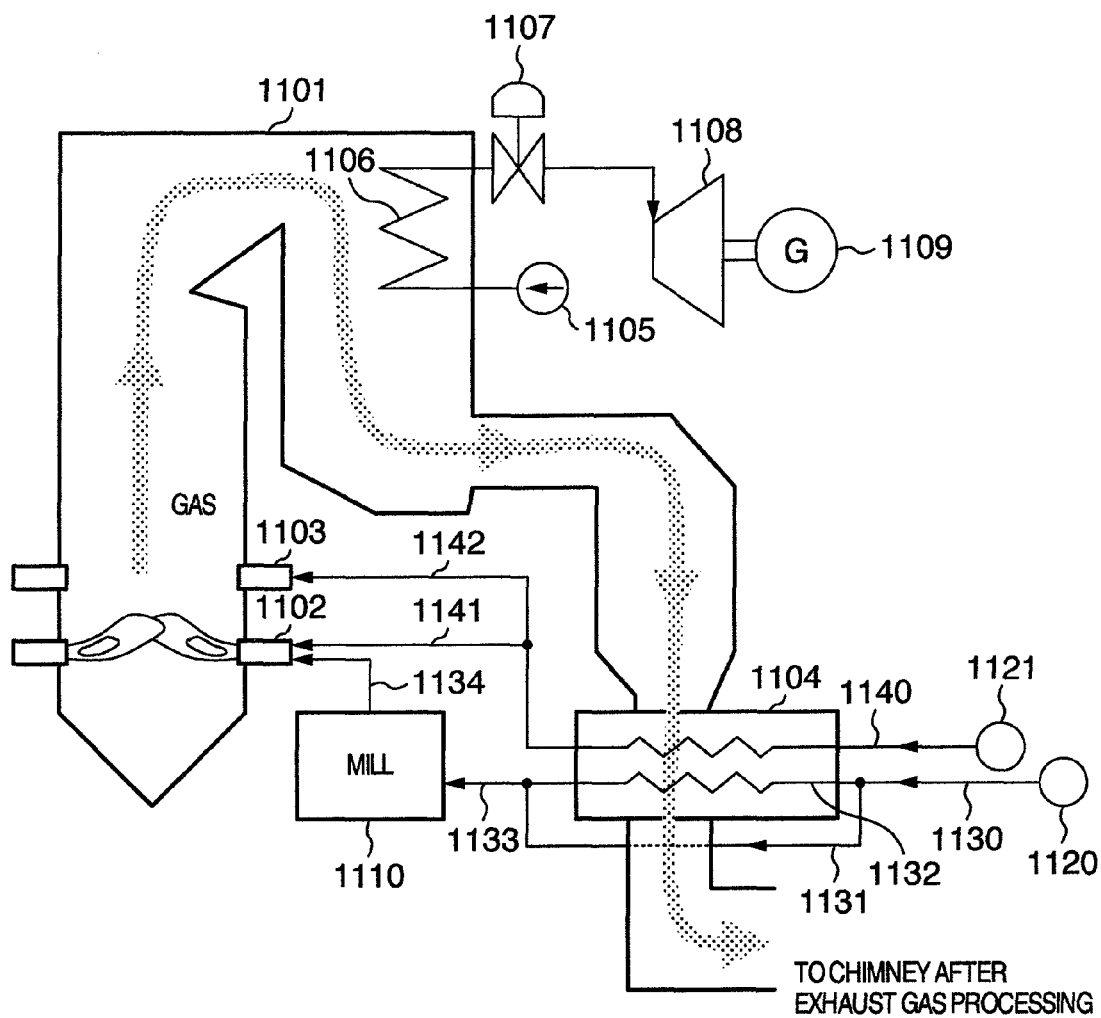
FIG. 33 is a diagram showing the structure of a thermal power plant.

FIG. 33 shows the structure of a thermal power plant to be controlled. Coal as fuel, primary air for coal transportation and secondary air for combustion adjustment are entered via a burner 1102 into a boiler 1101, and coal burns in the boiler 1101. Coal and primary air are guided by a pipe 1134, and secondary air is guided by a pipe 1141. After-air for two-stage combustion is entered via after-air ports 1103 into the boiler 1101. The after-air is guided by a pipe 1142.

High temperature gas generated by coal combustion flows in the boiler 1101 along a path indicated by an arrow, and thereafter passes through an air heater 1104. Thereafter, after hazardous substance is removed in an exhaust gas processing apparatus, the gas is discharged from a chimney to the atmospheric air.

Water circulating in the boiler 1101 is guided to the boiler 1101 via a water supply pump 1105, and heated excessively in a heat exchanger 1106 to be transformed into high temperature and high pressure steam. In this embodiment, although one heat exchanger is used, a plurality of heat exchangers may be used.

The high temperature and high pressure steam passed through the heat exchanger 1106 is guided via a turbine governor 1107 to a steam turbine 1108 which is driven by energy of the steam and makes a generator 1109 generate an electric power.

Next, description will be made on paths of primary air and secondary air entered from the burners 1102 and a path of after air entered from the after-air ports 1103.

The primary air is guided from a fan 1120 to a pipe 1130, branched intermediately into a pipe 1132 passing through the air heater 1104 and a pipe 1131 not passing through the air heater, again mixed in a pipe 1133, and guided to the mill 1110. Air passing through the air heater 1104 is excessively heated by the gas. By using this primary air, coal formed in the mill 1110, actually fine powder coal, is transported to the burners 1102.

The secondary air and after-air are guided from a fan 1121 to a pipe 1140, heated excessively in the air heater 1104, thereafter branched into a secondary air pipe 1141 and an after-air pipe 1142, and guided to the burners 1102 and after-air ports 1103, respectively.

The control apparatus 1200 has a function of adjusting the amount of air to be entered from the burners and the amount of air to be entered from the after-air ports in order to lower NOx and CO densities.

The control apparatus 1200 is constituted of: a basic operation command calculating unit 1230; a correcting unit 1250 for changing or correcting a basic operation command value 1235 output from the basic operation command calculating unit 1230; a running result database 1240 for accumulating and storing running result data constituted of a process measurement value as measurement information 1205, an input signal from an operator, a command signal from an upper level control system and the like; an input/output interface 1220 for data transfer relative to the control object plant 1100, an operator or the like; an input/output unit 1221 for an operator to check various data and input a setting value, a running mode, an operation command for manual running and the like; a numerical value analysis calculating unit 1400; an analysis result database 1402 for accumulating and storing analysis results calculated by the numerical value analysis calculating unit 1400; and a phenomenon visualizing unit 1255 for visualizing a phenomenon in the boiler.

Input data 1225 input from the input/output unit 1221 is sent to each calculating unit in the control apparatus via the input/output interface 1220.

The basic operation command calculating unit 1230 has as its basic constituent component a PID (proportion/integration/differentiation) controller, receives the measurement information 1205 including a process measurement value, an input signal from an operator, a command signal from an upper level control system and the like, in response to a load command signal 1051 from the central power supply command station 1050, and calculates and outputs a basic operation command value 1235 for various operation apparatus such as valves, dumpers and motors provided in the control object plant 1100.

Next, description will be made on the correcting unit 1250 for changing or correcting the basic operation command value 1235.

The correcting unit 1250 is constituted of a reinforcement learning unit 1290 and an operation command determining unit 1280.

The reinforcement learning unit 1290 has a function of learning an operation method suitable for the plant state by an enforcement learning theory, by using measurement data as the measurement information 1205 and numerical value analysis results 1401 calculated by the numerical value analysis calculating unit 1400.

The details of the reinforcement leaning method are described, for example, in "Reinforcement Learning" translated by both Sadayoshi MIKAMI and Masaaki MINAKAWA, Morikita Shuppan K.K., Dec. 20, 2000. Only the concept of the reinforcement learning will be described.

Figure 34:
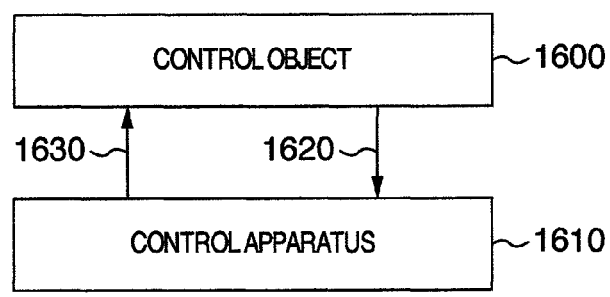
FIG. 34 is a diagram illustrating the concept of enforcement learning.

FIG. 34 illustrates the concept of the reinforcement learning. A control apparatus 1610 outputs a control command 1630 to a control object 1600. The control object 1600 operates in accordance with the control command 1630. In this case, the state of the control object 1600 changes with an operation by the control command. A reward 1620 is received from the control object 1600, the reward 1620 including information on whether the changed state is desired or not desired for the control apparatus and information on the degree of desirableness.

Information received from the control object is actually the state quantity of the control object, and generally the control apparatus 1610 calculates the reward from the received state quantity. It is generally set in such a manner that the reward becomes larger as the state becomes more desirous, whereas the reward becomes smaller as the state becomes less desirous.

The control apparatus 1610 performs an operation on the basis of trial and error to learn the operation method capable of obtaining the largest reward, i.e., the desirous mode state. In this manner, a control operation logic suitable for the state of the control object 1600 is automatically configured.

A learning theory with teacher, typically a neural network, is required to provide success cases as teacher data in advance, and is not suitable for a new plant without running data or a complicate phenomenon unable to provide success cases.

In contract, the reinforcement learning theory is classified into learning without teacher, and has an ability of generating a desirous operation by itself on the basis of trial and error. In this context, it is advantageous in that the reinforcement learning can be applied also to the case wherein the characteristics of a control object are not necessarily definite.

However, in order to learn by using only plant running data, it is required to wait until running data necessary for learning is accumulated sufficiently. It takes therefore a long time until the satisfactory effect is demonstrated. Since learning is based on trial and error, there is a possibility of a running state not desired, and in some cases, safety trouble may occur.

In this embodiment, therefore, leaning is made in advance to determine a suitable operation signal for a model simulating the control object.

The numerical value analysis calculating unit 1400 simulates a boiler structure of the control object plant 1100, and calculates a chemical reaction including combustion, gas flow, and thermal conduction by a numerical value analysis method including difference calculus, a finite volume method, a finite element method and the like.

It is desired that a precision of numerical value analysis is high. The present invention is not characterized in the analysis method and does not limit the analysis method. Therefore, description of the numerical value analysis is omitted. Generally, the shape of a boiler as the calculation object is divided into a calculation lattice (mesh), and a physical quantity in each lattice is calculated.

A gas temperature, a density of each gas composition, a gas flow speed, a flow direction and the like are calculated by numerical value analysis, and stored in the analysis result database 1402.

Phenomena under various operation conditions are calculated by numerical value analysis, and CO and NOx densities at measurement points of the control object plant 1100 are calculated. The calculation results at the measurement points are obtained for each calculation lattice (mesh) of a corresponding cross section.

Figure 35:
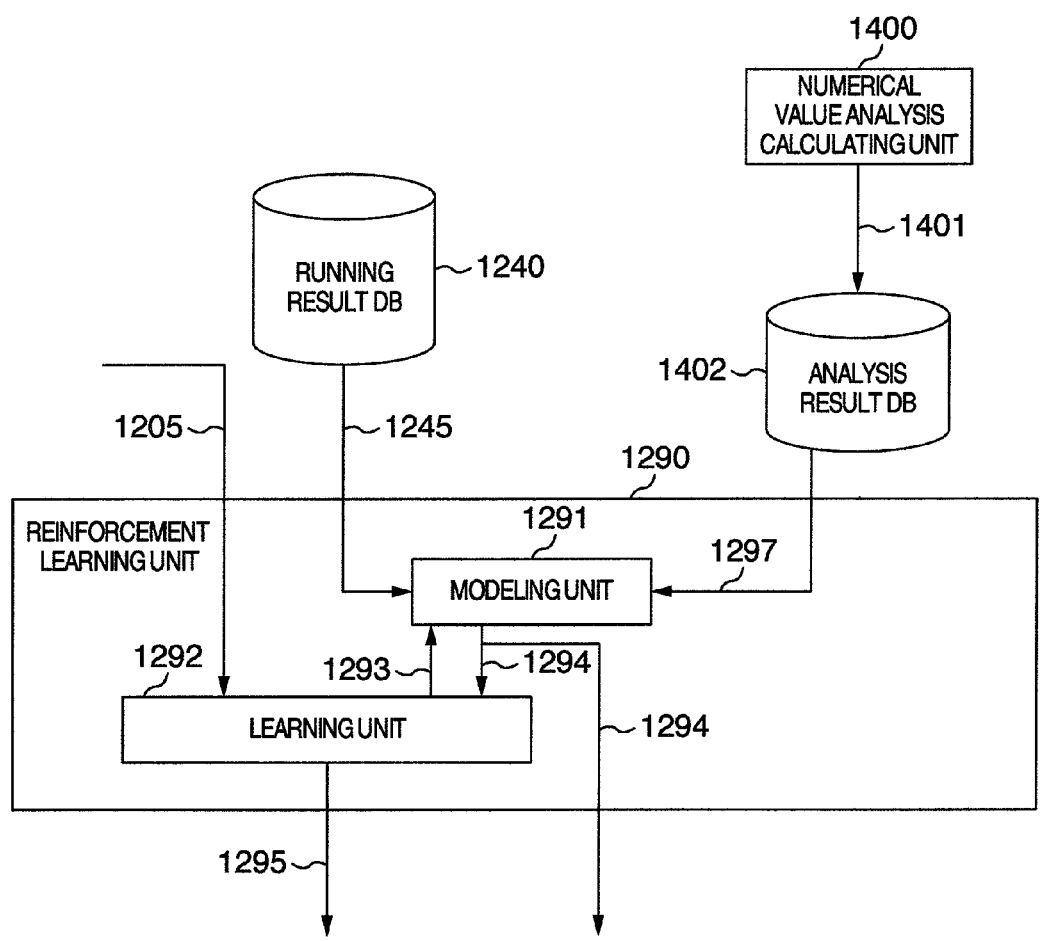
FIG. 35 is a diagram showing the structure of an enforcement learning unit.

FIG. 35 shows the structure of the enforcement learning unit 1290. The numerical value analysis results 1401 calculated by the numerical value analysis calculating unit 1400 are accumulated in an analysis result database 1402. A modeling unit 1291 reads necessary data 1297 from the analysis result database 1402, and calculates averages values of CO and NOx densities.

By using the calculated average densities as teacher signals and the operation conditions as an input signal, the modeling unit 1291 learns an input/output relation in a neural network constituted of an input layer, an intermediate layer and an output layer, by using an error back propagation method. The structure of a neural network and the learning method are those generally used. The leaning method may use a different learning method. Since the present invention does not depend upon the structure of a neural network and the learning method, the detailed description thereof is omitted.

A learning unit 1292 learns an operation method capable of suppressing a generation amount of CO and NOx by using the plant characteristics based on numerical value analysis learnt from the neural network, before the plant runs (before test running).

An operation signal 1293 corresponding to an operation amount includes an air flow rate at each position of burners and after-air ports and a fuel amount of each burner.

In this example, although the relation between the fuel amount and air flow rate and the NOx and CO densities is modeled, the input and output items of the present invention are not limited only thereto. A modeling method is not limited to a neural network, but other statistical models such as a regression model may be used.

The learning unit 1292 outputs the input data (operation signal 1293) to the model formed by the modeling unit 1291. The input data includes an air flow rate at each position of the burners and after-air ports and a fuel flow rate at each burner. The input data corresponds to the operation conditions of the plant. Each input data is set with upper and lower limit values, a change width (pitch width), a maximum change width per one operation. Each amount of the input data (operation signal 1293) is determined randomly in the allowable range.

The modeling unit 1291 inputs the input data (operation signal 1293) to the already formed model to calculate output data 1294 as the NOx and CO densities.

The learning unit 1292 receives the output data 1294, and calculates a reward value. The reward is defined by the following formula (1) where R is a reward value, ONOx is an NOx value, OCO is a CO value, SNOx is an NOx target value, SCO is a CO target value, and k1, k2, k3 and k4 are positive constants.

$$R = R_1 + R_2 + R_3 + R_4 \quad (1)$$

$$R_1 = \begin{cases} k_1 & (O_{NOx} \leq S_{NOx}) \\ 0 & (O_{NOx} > S_{NOx}) \end{cases}$$

$$R_2 = \begin{cases} k_2 & (O_{CO} \leq S_{CO}) \\ 0 & (O_{CO} > S_{CO}) \end{cases}$$

$$R_3 = \begin{cases} k_3(S_{NOx} - O_{NOx}) & (O_{NOx} \leq S_{NOx}) \\ 0 & (O_{NOx} > S_{NOx}) \end{cases}$$

$$R_4 = \begin{cases} k_4(S_{CO} - O_{CO}) & (O_{CO} \leq S_{CO}) \\ 0 & (O_{CO} > S_{CO}) \end{cases}$$

As shown in the formula (1), if the NOx and CO values lower than the target values, rewards R1 and R2 are given, and if the NOx and CO values lower further, rewards are given in proportion to a deviation.

Other various reward defining methods may be used, and the present invention is not limited to the method given by the formula (1).

The learning unit 1292 learns a combination of input data (operation signal 1293), i.e., operation amounts, so as to maximize the reward so that the learning unit can learn a combination of operation amounts capable of reducing NOx and CO in correspondence with the present state.

In the state that learning is completed, the learning unit 1292 reads running data (measurement information 1205) at the present time, and outputs the operation amounts 1295 maximizing the reward of the formula (1) in accordance with the learning results.

The present invention does not depend on this reward giving method, but other methods may also be used.

As described above, the running operation method capable of suppressing CO and NOx can be obtained by reinforcement learning even before plant running, i.e., even without running result data. The control apparatus can be applied from the test running, demonstrating the effect of the present invention.

If learning is performed by using only running result data, it takes several weeks and several months to collect data. During this period, there is a possibility that sufficient control performance cannot be obtained. There is therefore a fear that environments become bad because of high CO and NOx densities or that a consumption amount of chemicals such as ammonium used by a denitrification apparatus increases.

Since running is performed on the basis of trial and error, there is a danger of the state not suitable for safety running. The embodiment method is effective for suppressing and avoiding these risks.

It is however difficult to eliminate an error of numerical value analysis results, e.g., to make zero a deviation from real plant measurement values. Therefore, after the plant starts operating, the characteristics of the neural network model are corrected by using running result data of the plant.

To this end, the modeling unit 1291 has a function of performing additional learning from running data 1245, by adding the relation data between the operation amount and CO and NOx densities to the numerical value analysis data. The additional learning reflects the characteristics of the running data 1245 upon the characteristic model of the neural network. The learning unit 1292 has also a function of learning again by using the model corrected by the running data 1245. It is therefore possible to learn the operation method having a high precision and a good control performance.

The operation (control) method configured as the result of learning is difficult to logically grasp the cause and effect, like the logical diagram of the PID control.

It is therefore difficult to confirm in advance the adequacy of learning results when a learning type control apparatus is used actually. There is therefore a reliability issue of plant control which is essential for stable and safe running.

The present invention is characterized in the provision of the phenomenon visualizing unit 1255 for visualizing a phenomenon in the boiler and displaying the relation between the operation (control) and the phenomenon in the boiler.

This embodiment aims to suppress the generation of CO and NOx in the boiler. CO and NOx are generated by reaction during combustion, and influenced by contact with oxygen (air), a temperature in the reaction field and the like. CO in particular is greatly influenced by insufficient oxygen relative to a fuel amount. Therefore, by visualizing a gas flow including fuel supplied from the burners, contact with air supplied from the air ports and a mixture state, it becomes easy to objectively understand the relation between an control operation and a phenomenon in the boiler and the relation to the suppression effect of CO and the like. With visualization, it becomes easy to understand the influence of the control operation and a phenomenon in the boiler upon hazardous composition generation.

Since adequacy of the control operation as learning results can be confirmed, reliability of the control apparatus can be improved.

The phenomenon visualizing unit 1255 will be described in the following.

The phenomenon visualizing unit 1255 is constituted of a stream line data calculating unit 1260, a stream line data interpolating unit 1261, a condition adaptive data extracting unit 1262 and a stream line drawing unit 1265. Both or one of the stream line data interpolating unit 1261 and condition adaptive data extracting unit 1262 may be omitted.

Figures 36A, 36B:
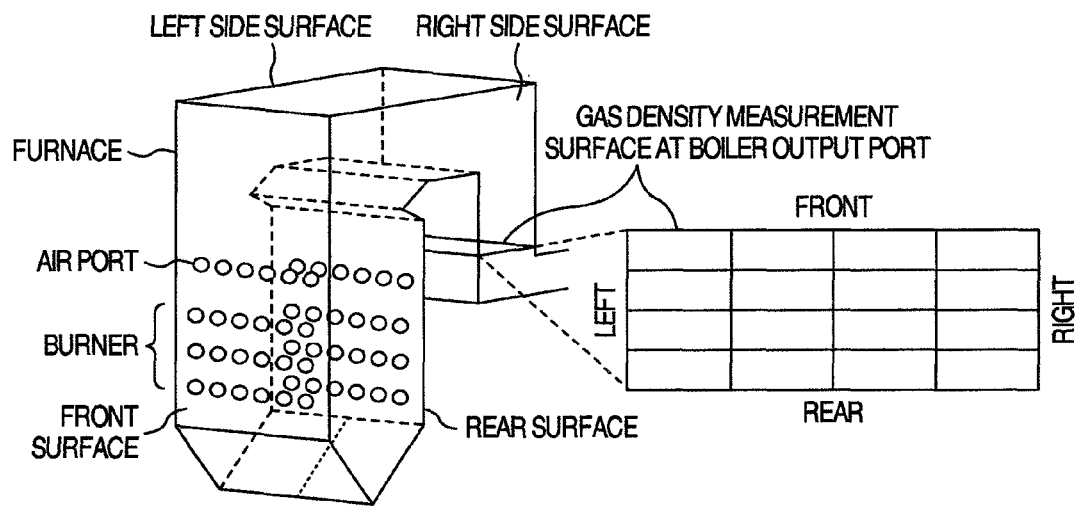
FIG. 36A is a diagram showing burners, air ports and gas density measuring positions.
FIG. 36B is a diagram showing burners, air ports and gas density measuring positions.
Figure 37:
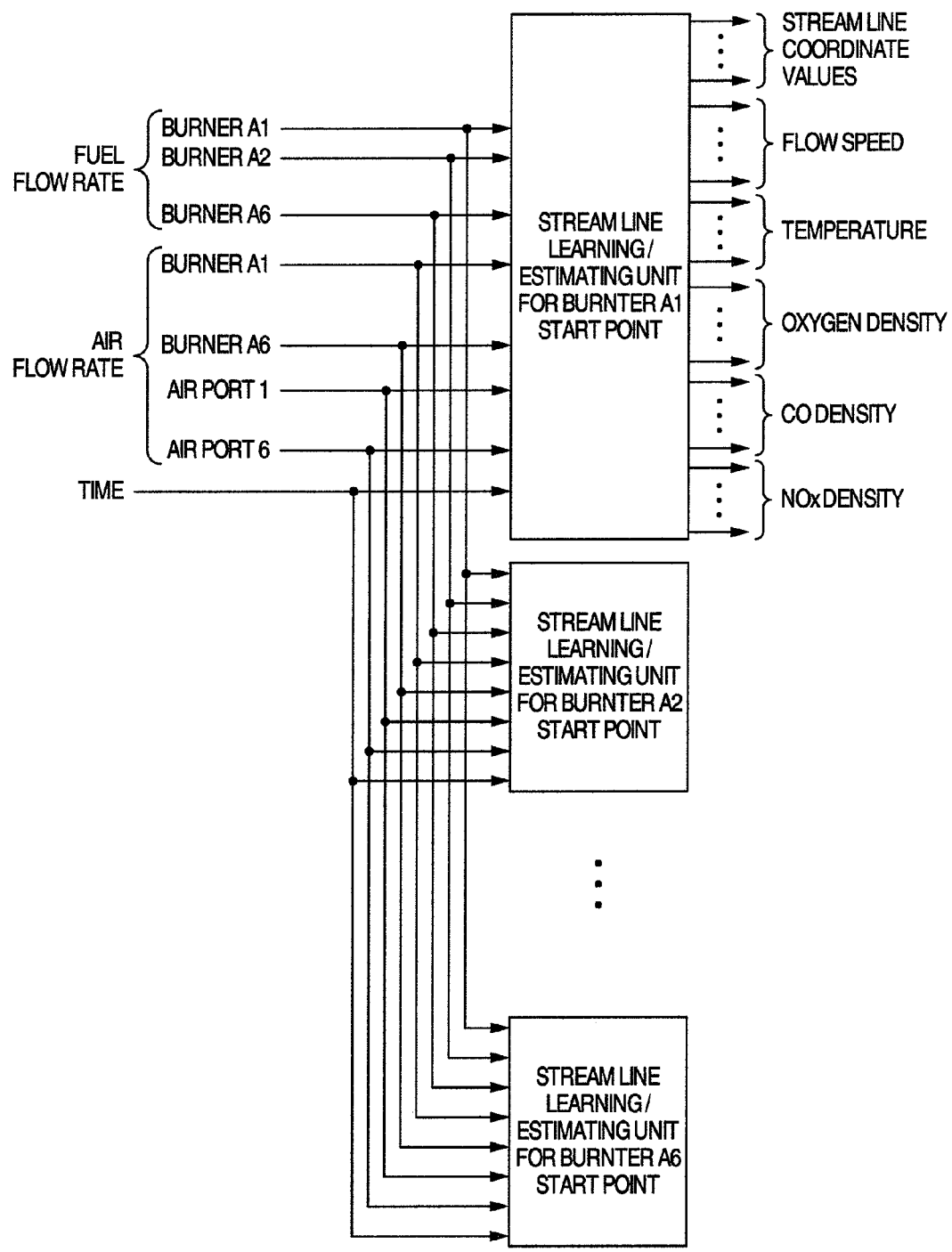
FIG. 37 is a diagram showing a first structure of a stream line data calculating unit.

The stream line data calculating unit 1260 is a neural network having input/output items such as shown in FIG. 37. Symbols A1, A2 and the like in FIG. 37 represent the positions of burners and air ports, and this correspondence is shown in FIGS. 36A and 36B.

The neural network is divided for each burner and each air port, and calculates a locus of a gas flow supplied from each burner and each port. The neural network can learn the relation between input data and output data, by correcting weight coefficients of networks by an error back propagation method so as to make small an error between the output data output when the input data is given and teacher data prepared in advance.

All the input data is the same, and the output data is three-dimensional coordinate data of a stream line having each burner or each air port as a start point.

First, the input data will be described. The input data contains a fuel flow rate and an air flow rate supplied to each burner, an air flow rate supplied to each air port, and time data. The fuel flow rate and air flow rate may be either a measurement value or a control command value. If a flow rate is equally distributed to each burner stage (e.g., A1 to A6 burners), a total flow rate of not one burner but one burner stage or a flow rate of each burner at each burner stage may be input.

Time data inputs a lapse time from a nozzle output port to a boiler output port of gas supplied from a burner or air port, at a predetermined time interval.

It is therefore possible to identify the position (coordinate values) where gas output from the nozzle reaches, as the function of time lapse.

The output data contains the coordinate data of a stream line using each burner and each air port as a start point, a flow speed, a gas temperature, an oxygen density, a carbon monoxide density and a nitrogen oxide density, respectively at each coordinate position.

Learning the neural network uses numerical value analysis results under different conditions of the fuel and air amounts of each burner and each air port. The input data is calculation condition (boundary condition) data for the fuel and air flow rates of each burner and each air port, and the teacher data is numerical value analysis results for the output data items.

Running data of the fuel and air flow rates of each burner and each air port is input to the learnt neural network during running control, and a gas flow in the boiler is output as an estimated value 1263.

Figure 38:
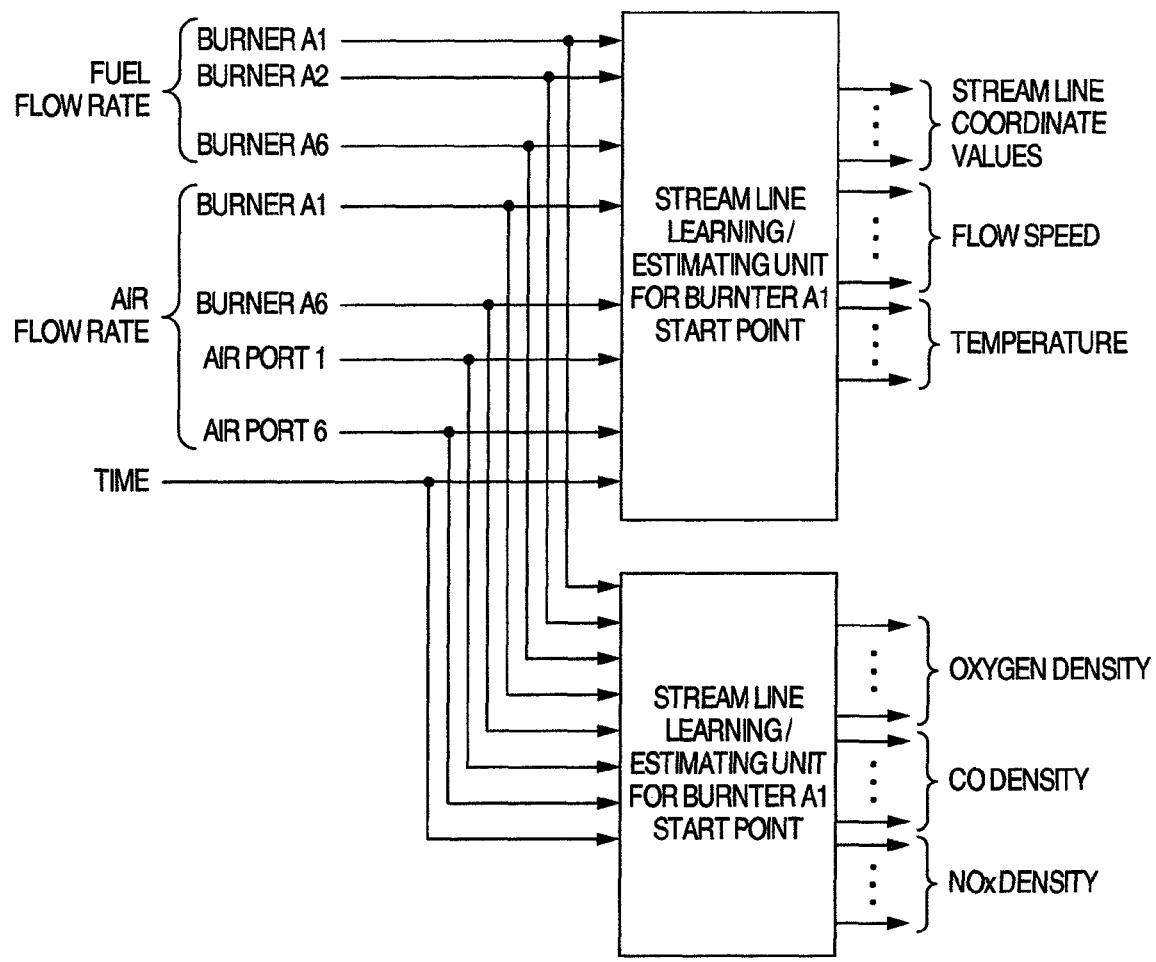
FIG. 38 is a diagram showing a second structure of the stream line data calculating unit.

The structure of the neural network may have a structure that output items are divided into a plurality of items such as shown in FIG. 38. By dividing the output items, it is expected that a learning precision is improved. If a computer has a plurality of CPU's, parallel calculations are performed to possibly shorten a learning time.

It is assumed that the teacher data indicates a motion position (coordinate values) of gas flowing from a nozzle output port to the boiler output port obtained at a predetermined time interval. If this time interval is made short, an error becomes small between a stream line to be learnt and the numerical value analysis results. However, the shorter the time interval, the number of data sets increases and a learning time becomes long. There is therefore a possibility of a practical problem in terms of computer calculation time and the like.

By considering that the time interval is required to be long to some degree, the embodiment provides the stream line data interpolating unit 1261. The stream line data to be learnt is spatially discrete data. If the time interval is short, the displayed learning results become a continuous flow of an aggregation of points, whereas if the time interval is long, flow continuity is hard to be recognized because a distance between points becomes long.

The stream line data interpolating unit 1261 receives the estimated values 1263 output from the stream line data calculating unit 1260, interpolates the coordinate points of the preceding time step and next time step for each data point of the estimated values 1263 to thereby make the connection relation between data points be easily recognized. An interpolation method may be linear interpolation of two points or approximation by a high order formula using a plurality of points. The number of coordinate data sets is increased to interpolate data points output from the neural network. Similarly, interpolation data is generated also for the output items other than the coordinate data.

Data of the gas flow/performance in the boiler generated in the manner described above is displayed on the display screen 223. If all stream lines having the burners and air ports as start points are displayed at the same time, stream lines are superposed three-dimensionally and are difficult to distinguish them.

To avoid this, the present invention uses the condition adaptive data extracting unit 1262 to select data to be displayed.

In this example, only stream lines are displayed which reach the area having a CO or NOx density not lower than a set value or an oxygen density not higher than a set value, respectively at the gas density measurement position as the boiler output port shown in FIGS. 36A and 36B.

First, only data points adaptive to the above-described conditions are searched from all data of the estimated values 1263 at the gas density measurement point output from the stream line data calculating unit 1260, and time lapse steps are traced reversely from the searched data points so that the stream line data reaching the measurement points can be extracted.

It is therefore possible to easily understand a phenomenon, because it is possible to visually recognize which burner flows a large amount of the fuel gas to the area having a high CO or NOx density or an area having a low oxygen density, and whether the air flow reaching the area is small or not.

Furthermore, the burner or air port whose stream line is desired to be viewed can be designated in order to check that the gas supplied from the burner or air port reaches what area at the boiler output port via which path.

The data adaptive to these conditions is selected and output to the stream line data interpolating unit 1261 as selected data 1264.

An actual gas flow in the boiler is considered not a simple laminar flow, because of the influence of flow rate difference between the burners and air ports. It is therefore difficult to intuitively estimate a gas flow in the boiler.

According to the present invention, it is easy to understand how the control operation is learnt in accordance with which phenomenon, and adequacy of learning results can be evaluated without using a black box.

The stream line drawing unit 1265 receives data sets 1210 which contain the data selected by the condition adaptive data extracting unit 1262 and added to the interpolation data calculated by the stream line data interpolating unit 1261, and performs a calculation process to draw a three-dimensional image on the display screen 1223.

Three-dimensional data 1256 obtained through the calculation process is output to the display screen 1223. The three-dimensional image data 1256 is sent to the display screen as screen display information data 1224 via the input/output interface 1220.

Figure 41:
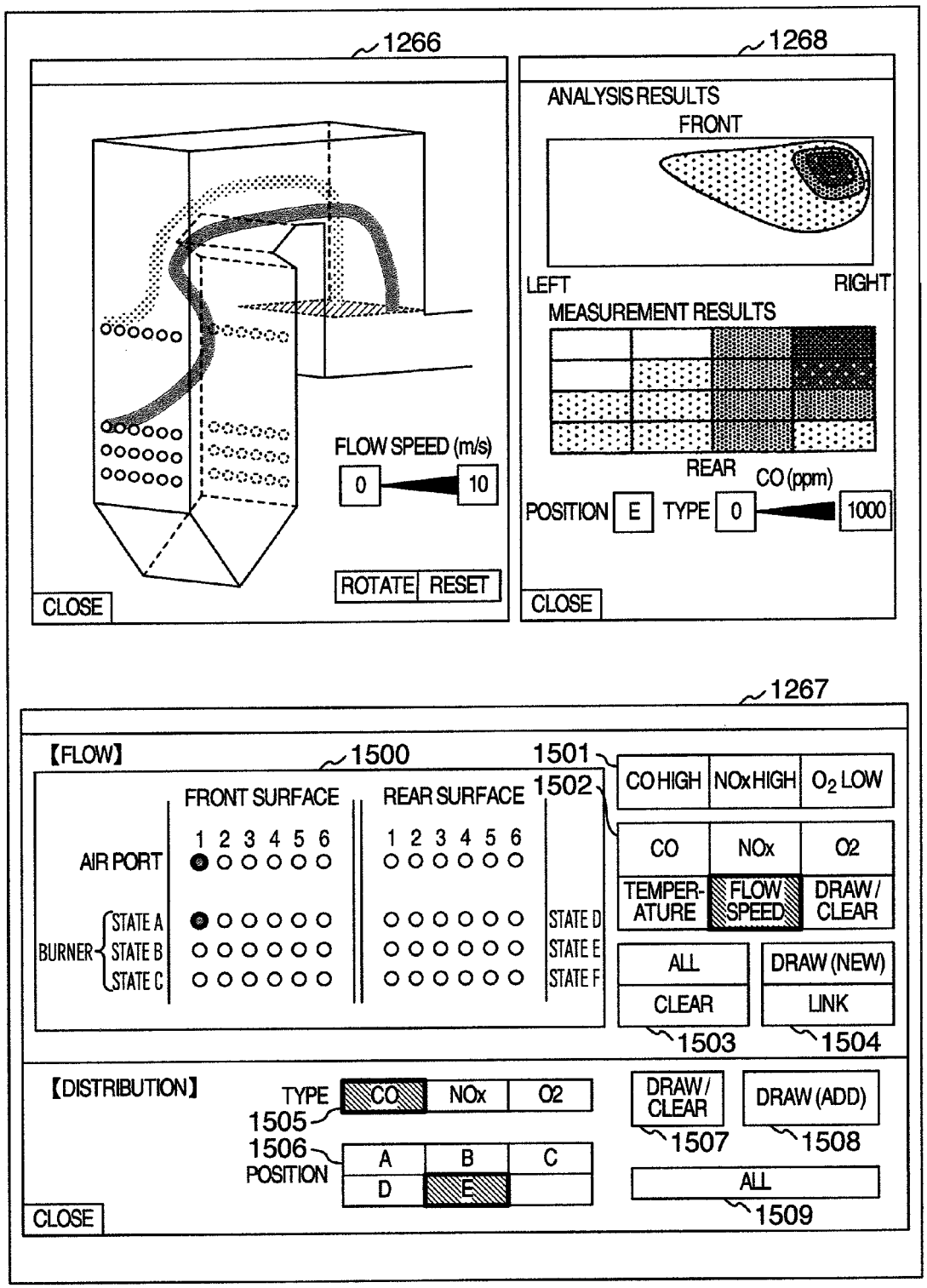
FIG. 41 is a diagram showing examples of display screens for stream line data and gas property distribution data and a display screen for setting display conditions.

An example of the display screen is shown in FIG. 41. The outer shape of the boiler and the positions of the burners and air ports are displayed three-dimensionally in a window 1266. As a rotation button at the lower left of the window is pushed with a mouth 1222 having a keyboard as an input device of the input/output unit 1221, a three-dimensional cubic image can be rotated freely and viewed in various directions. As a reset button is depressed, an initial (default) display state is recovered.

A window 1268 displays gas density distributions at a designated cross section along a boiler gas flow path. The upper stage indicates estimated values based on the numerical value analysis results, the lower state indicates the corresponding measured gas densities in color or gradation.

Figure 40:
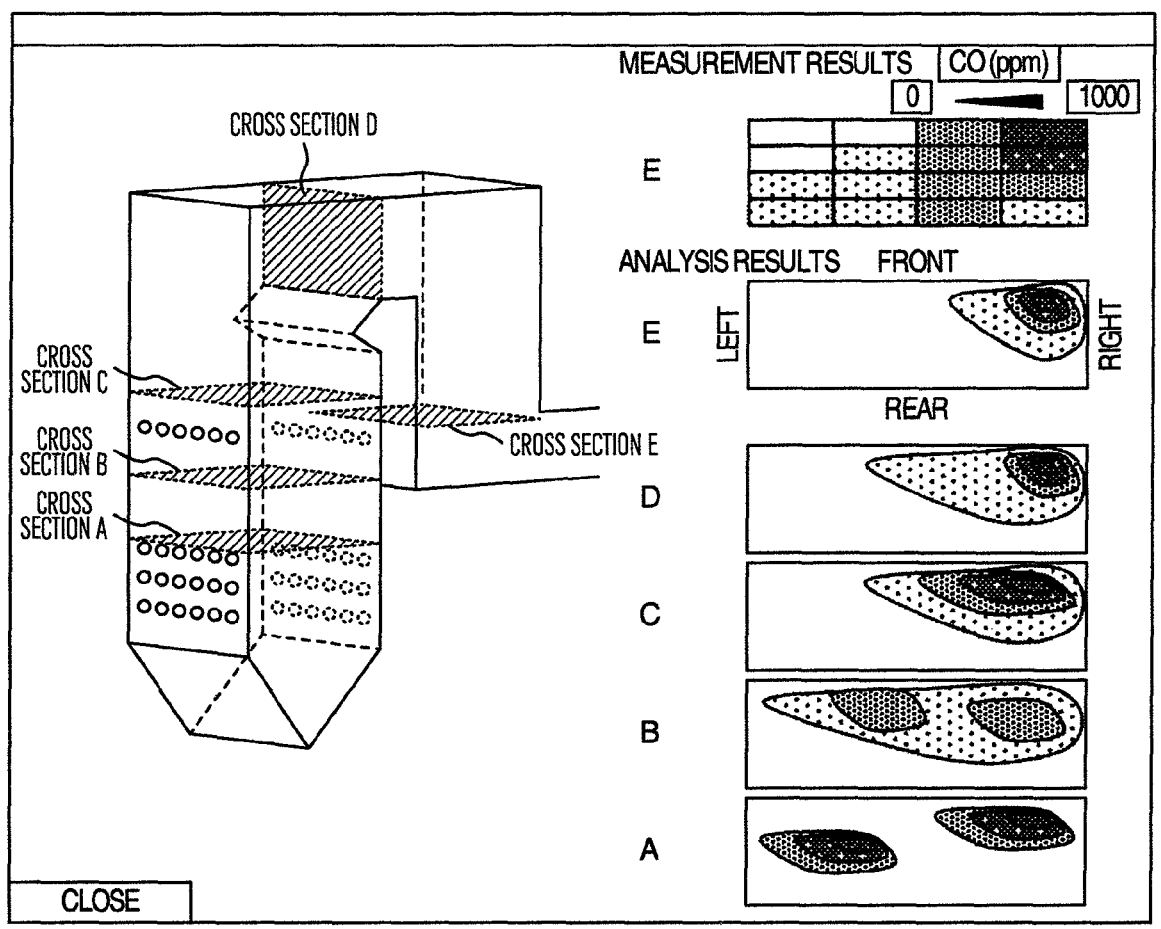
FIG. 40 is a diagram showing set positions of gas flow path cross sections and a density distribution at each cross section.

A plurality of cross section positions are set beforehand, and desired ones can be selected. FIG. 40 shows setting examples of the cross section positions. A cross section A is at an upper position of the burners, a cross section B is at an intermediate position between the burners and air ports, a cross section C is at an upper position of the air ports, a cross section D is at an output position of the furnace, and a cross section E is at a boiler output port (gas density measurement position).

As shown in FIG. 40, the estimated values and measurement values of gas densities at each cross section are displayed on the same screen. It can therefore be judged how the gas density changes in the upstream side of gas, in the burner area and in the air port area, and whether the estimated value is adequate, from comparison with the measurement value.

Figure 39:
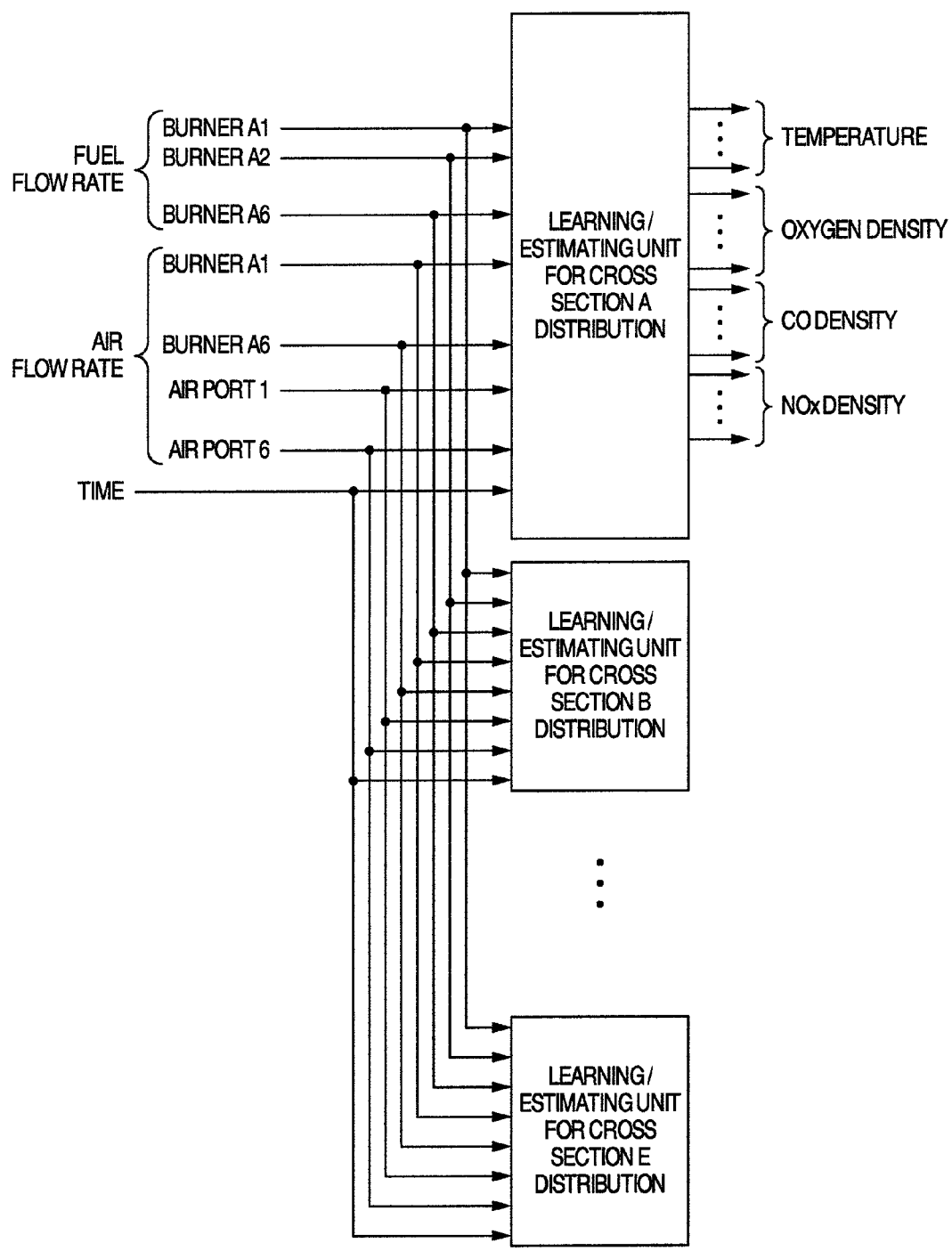
FIG. 39 is a diagram showing an example of the structure of a distribution information learning/estimating unit for learning/estimating distribution information at gas flow path cross sections.

In estimating a gas density at the designated cross section along the gas flow path, the neural network is used similar to the stream line data calculating unit 1260. FIG. 39 shows an example of the structure of the neural network. Input data is the same as that of the stream line data calculating unit 1260. The network is formed for each cross section shown in FIG. 40. Output data includes a temperature, a CO density, an NOx density and an oxygen density at each cross section, and is learnt by using as teacher data the value of each calculation lattice at the cross section.

If the number of calculation lattices is large and a learning time becomes too long, a lattice length at the cross section is reconfigured to be long, and an average of lattice lengths of a plurality of lattices in the reconfigured lattice is used.

A window 1267 shows an example of a screen for setting display conditions of the windows 1266 and 1268. An upper area of the window 1267 is used for setting the window 1266, and the lower area is used for setting the window 1268.

An upper left area 1500 of the window 1267 shows a layout of burners and air ports, and the air port or burner whose stream line is to be drawn can be selected. In FIG. 41, an air port 1 and a burner A1 are selected. The upper most stage 1501 in the upper right area has three buttons "CO high", "NOx high" and "O2 low" for selecting stream lines satisfying the predetermined conditions of a gas density at the designated cross section. As one of the buttons is depressed, only stream line data satisfying the conditions can be displayed through comparison with a reference value of each preset composition density. These processes are executed by the condition adaptive data extracting unit 1262.

A right middle stage 1502 has buttons for selecting items including a CO density, an NOx density, an O2 (oxygen) density, a gas temperature and a flow speed, for the stream line data to be displayed in the window 1266 in color or gradation. The selected data is displayed. In FIG. 41, the flow speed is selected. As a "draw/clear" button is depressed, newly designated data is additionally displayed on the e image displayed in the window 1266. As the "draw/clear" button is depressed again, only the data last added is erased.

As an "ALL" button at a right lower left stage 1503 is depressed, all stream lines having all burners and air ports as start points are displayed. As a "clear" button is depressed, all the displayed stream lines are erased.

Figure 43:
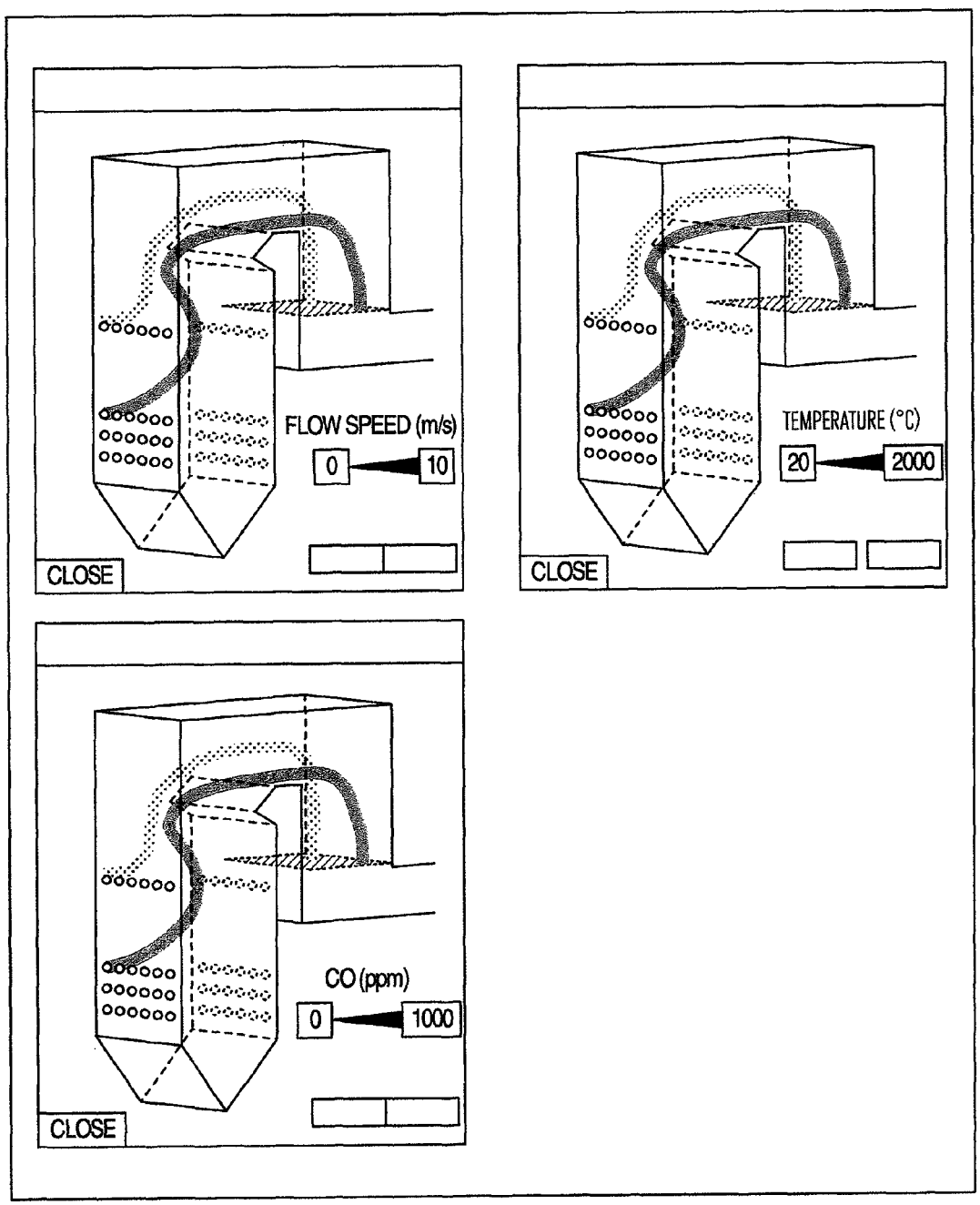
FIG. 43 is a diagram showing examples of display screens of a plurality type of pieces of stream line data.

As a "draw (new)" button at a right lower right stage 1504 is depressed, the window 1266 is displayed as a new window. Therefore, as shown in FIG. 43, different data such as a flow speed, a temperature, a CO density and the like can be displayed at the same time. As a "link" button is depressed and one of the windows shown in FIG. 43 is rotated, images in the other windows are also rotated in unison. It is therefore possible to confirm the state of the boiler by using difference items.

Type select buttons 1505 in the lower area of the window 1267 are used for selecting the types of data displayed in the window 1268 including a CO density, an NOx density and an O2 (oxygen) density. Position select buttons 1506 are used for selection a cross section to be displayed from all the cross sections A to E shown in FIG. 40.

As a "draw/clear" button 1507 at the right upper stage is depressed, data displayed in the window 1268 is erased. As the "draw/clear" button is depressed again, the selected data is drawn. As a "draw (add)" button 1508 is depressed, the window 1268 is displayed as another window having a plurality of windows.

As an "ALL" button 1509 at the right lower stage is depressed, data at all the cross section positions is displayed as shown in FIG. 40.

Figure 42:
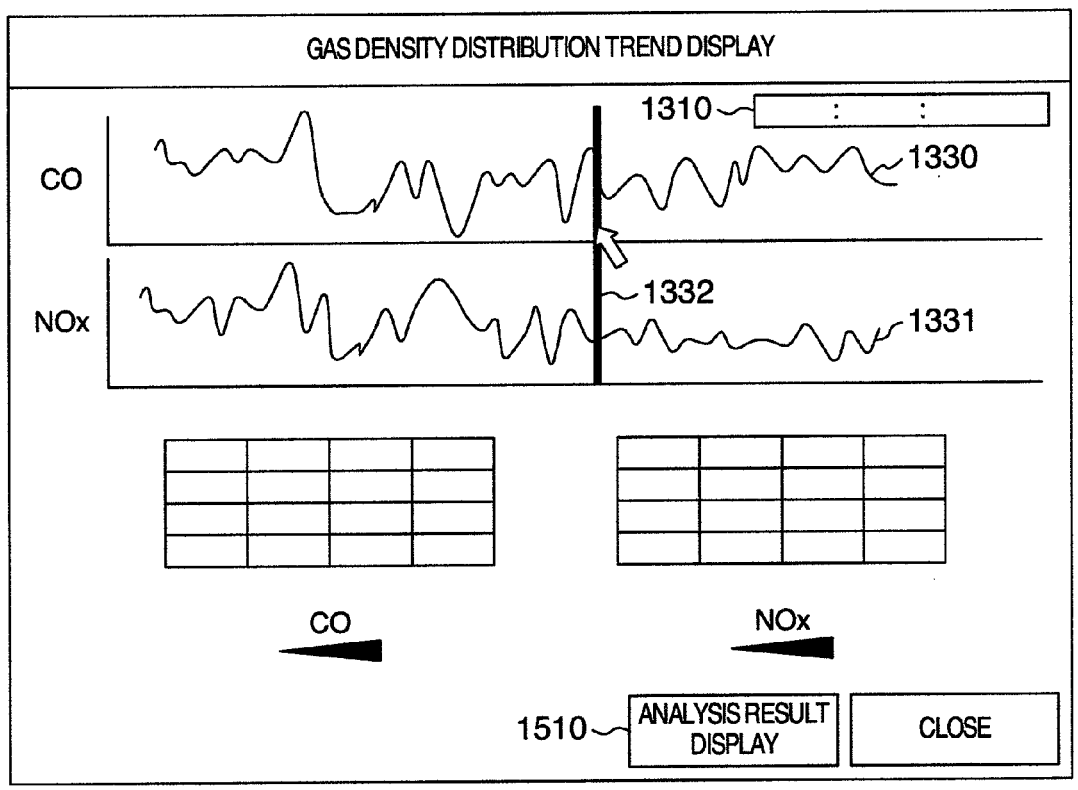
FIG. 42 is a diagram showing examples of display screens for actual gas density data trends and a display screen for time setting.

By utilizing the functions of the present invention described above, past data can also be analyzed. FIG. 42 shows an example of a display screen showing the trend of running result data of CO and NOx densities. A CO density trend graph 1330 is displayed at the screen upper stage, and an NOx density trend graph 1331 is displayed at the screen lower stage. The displayed data is stored in the running result database 1240. A time to be selected can be designated by moving right and left a time designation line 1332 with the mouse. The selected date and time are displayed in an area 1310.

The density distributions (measurement values) of CO and NOx at the designated time are displayed in the screen lower area. As an "analysis result display" button 1510 at the screen lower right is depressed, stream line estimation data at the selected time and the gas density distribution and the like at the designated cross section can be displayed on the screen shown in FIG. 41.

By analyzing the past running results by using this function, it is possible to confirm the operation adequacy and grasp a tendency difference between estimated values and measurement values. This function can be utilized for training an operator. Running is performed manually in the case of trouble such as a failure of the plant or control apparatus. In such a case, judgment by an operator becomes important. It is therefore desired that the relation between a running operation and a phenomenon is understood and well studied.

Figure 44:
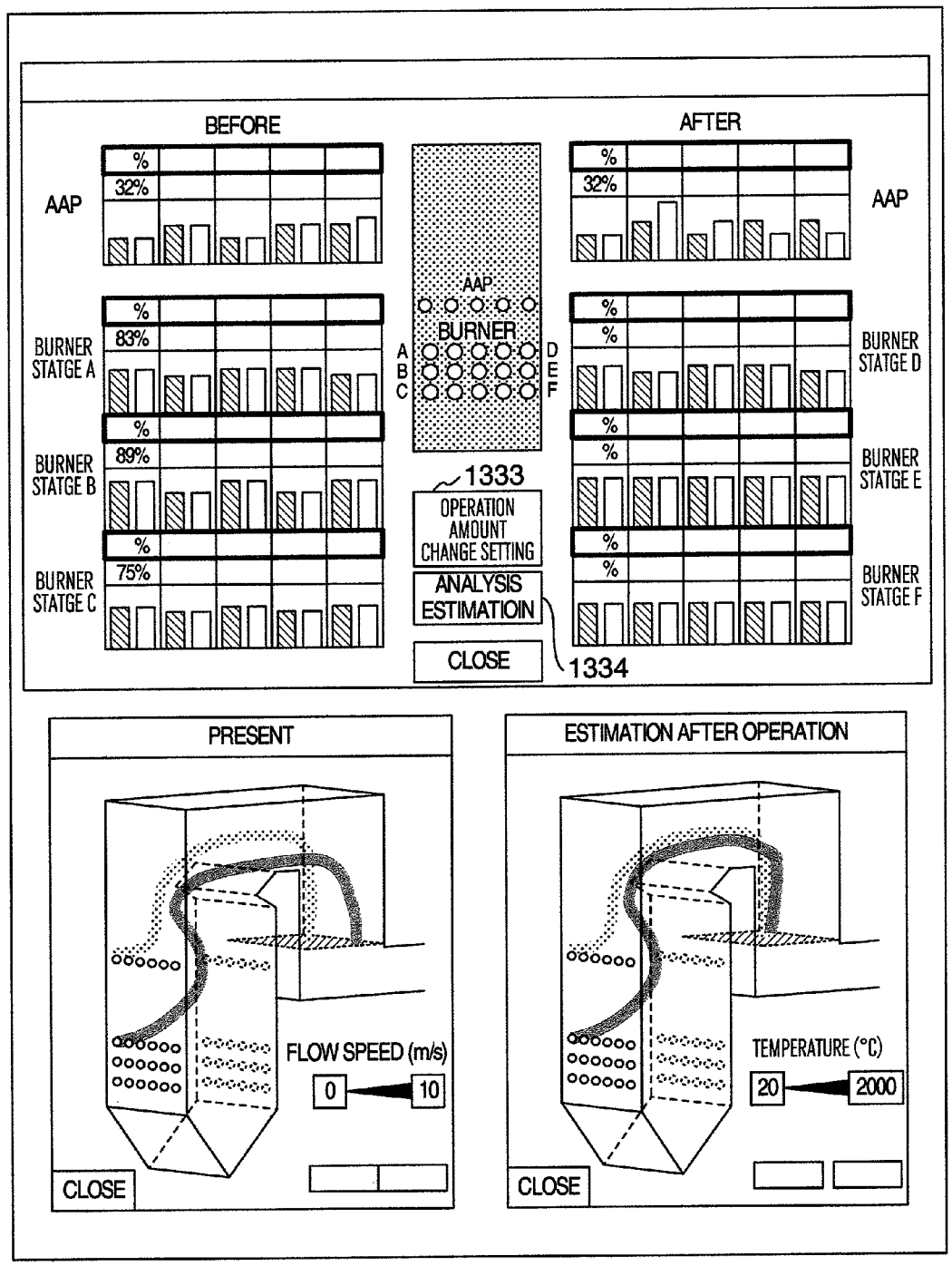
FIG. 44 is a diagram showing examples of display screens for set fuel and air amounts of burners and air ports and a display screen for an estimated gas stream line.

A screen shown in FIG. 44 illustrates a support function for running training or manual running. The fuel and air flow rates of the front and rear burners and air ports of the furnace are displayed by bar charts and digital numerical values in the right and left areas of the screen. An operator refers to this screen and can set a change value of an operation amount for trial.

A change in the operation amount may be made by moving up and down the bar chart with the mouth or by inputting a digital numerical value from a keyboard. The bar charts and digital numerical values are linked together.

After a change value of the operation amount is set, as an operation amount change setting" button 1333 is depressed, the input numerical value becomes a control command value. As an "analysis estimation" button 1334 is depressed, stream line estimation diagrams of the present and after an operation amount change are displayed in the lower screen for comparison. Estimated values of the gas density distributions shown in FIGS. 40 and 41 may be displayed. An operator can determine a properly judged operation amount by referring to the results.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A plant control apparatus having operation signal generating unit for calculating an operation signal to be supplied to a plant by using a measurement signal representative of a running state amount of the plant, comprising: a measurement signal database for storing a past measurement signal; an operation signal database for storing a past operation signal; numerical value analysis executing unit for analyzing running characteristics of the plant; a numerical value analysis result database for storing numerical analysis results obtained by operating said numerical analysis executing unit; a model for estimating a value of a measurement signal obtained when an operation signal is applied to the plant, by using information in said numerical value analysis result database; learning unit for learning a plant operation method by using said model; a learning information database for storing learning information obtained by said learning unit; a control logic database for storing information to be used by said operation signal generating unit when an operation signal is derived; a knowledge database for storing knowledge regarding the running characteristics of the plant; analyzing unit for processing information in said numerical value analysis result database, by using information in said knowledge database, said learning information database, said operation signal database and said measurement signal database; and an analysis result database for storing an analysis result by said analyzing unit, wherein said analyzing unit includes at least one of learning base analyzing unit for evaluating adequacy of the operation method learnt by said learning unit, signal analyzing unit for evaluating an effect obtained if the operation signal is applied to the plant and presence/absence of an abnormal measurement signal, and knowledge database updating unit for adding information to or correcting information in, said knowledge database.

2. The plant control apparatus according to claim 1, wherein said learning base analyzing unit comprises: unit for setting an initial value of a running condition; unit for extracting an operation signal change width of said operation condition from said learning information database; unit for extracting two numerical value analysis results corresponding to said operation condition and an operation condition after an operation signal is changed, from said numerical value analysis result database; judging unit for comparing said two numerical value analysis results and judging whether a difference therebetween can be explained by knowledge in said knowledge database; and unit for storing, if said judging unit judges that the knowledge in said knowledge database explains the difference between said two numerical value analysis results, the two numerical value analysis results and knowledge in said analysis result database.

3. The plant control apparatus according to claim 1, wherein:

said signal analyzing unit has at least one of an operation signal evaluation functional block and a measurement signal evaluation functional block; said operation signal evaluation functional block comprises: unit for extracting two operation signals before and after the operation signal is changed, from said operation signal database; unit for extracting two numerical value analysis results corresponding to the two operation signals from said numerical value analysis result database; unit for extracting knowledge capable of explaining a difference between said two numerical value analysis results from said knowledge database; and unit for storing the extracted knowledge and numerical value analysis result in said analysis result database; and said measurement signal evaluation functional block comprises: unit for extracting a present operation signal from said operation signal database; unit for extracting a numerical value analysis result corresponding to the operation signal from said numerical value analysis result database; unit for comparing a value of a present measurement signal with the numerical value analysis result; unit for extracting, if a deviation is large between a value of the present measurement signal the numerical value analysis result, knowledge indicating a reason of a large deviation from said knowledge database; and unit for storing the extracted knowledge in said analysis result database.

4. The plant control apparatus according to claim 1, wherein:
said knowledge database updating unit has at least one of a knowledge evaluation functional block, a knowledge correction functional block and a knowledge addition functional block;
said knowledge evaluation functional block comprises unit for extracting the number of use times of knowledge regardinq the running characteristics in said knowledge database from said analysis result database; unit for calculating a larger evaluation value of the knowledge the larger the number of use times of the knowledge is; and unit for storing the knowledge evaluation value in said knowledge database;
said knowledge correction functional block comprises: unit for selecting knowledge to be corrected from said knowledge database; unit for correcting the knowledge so as not to contradict information in said numerical value analysis database, said measurement signal database and said operation signal database; and unit for storing the corrected knowledge in said knowledge database; and
said knowledge addition functional block comprises: unit for generating a hypothesis of knowledge; unit for evaluating adequacy of said hypothesis by using information in said numerical value analysis result database, said measurement signal database and said operation signal database; and unit for storing, if said evaluation result is good, said hypothesis in said knowledge database.

5. The plant control apparatus according to claim 1, wherein said knowledge data base stores knowledge regarding a running state of the plant and influence of said plant running state upon a running performance of the plant, preliminary knowledge regarding an effect obtained by changing the operation signal, knowledge regarding a factor causing an abnormal value of the control signal and a method of avoiding the factor.

6. The plant control apparatus according to claim 1, wherein when the evaluation value of knowledge is stored in said knowledge database, said learning base analyzing unit or the learning base analyzing unit refer to knowledge in said knowledge database in an order of knowledge having a higher evaluation value.

7. The plant control apparatus according to claim 1, wherein there is provided a functional block for displaying information on an image display apparatus wherein the information is in said measurement signal database, said operation signal database, said control logic database, said learning information database, said numerical value analysis result database and said knowledge database.

8. The plant control apparatus according to claim 7, wherein an operation signal to be input next and a result of analysis of adequacy of inputting said operation signal to the plant are displayed on a screen and there is provided a menu for making an operator of the plant judge whether said operation signal is input to the plant.

9. The plant control apparatus according to claim 1, wherein:
the plant control apparatus is applied to a thermal power plant; and
said knowledge database stores knowledge regarding the influence upon a plant performance factor, the knowledge includes a position of gas passing through the boiler, a gas temperature and a gas flow rate at the position, a gas composition in weight or density of at least one of fine particles including nitrogen oxide, carbon monoxide, carbon dioxide, sodium oxide, mercury, fluorine, dust, mist and volatile organic compound, respectively at a boiler output port, and a plant running efficiency.

10. A plant control apparatus having operation signal generating unit for calculating an operation signal to be supplied to a plant by using a measurement signal representative of a running state amount of the plant, comprising:
numerical value analysis executing unit for calculating a numerical value representative of characteristics of the plant;
learning unit for learning for learning a method of generating the operation signal to make the plant have a desired running state, by using a model configured in accordance with a numerical value analysis result by said numerical value analysis executing unit; and
analyzing unit for analyzing an effect of changing the operation signal in accordance with a learning result, in accordance with said numerical value.

11. A control apparatus for a plant having a boiler comprising:
stream line data calculating unit for learning a relation between input data and output data by using a numerical analysis result including at least a gas flow phenomenon occurring in the boiler, and by using, as the input data, at least a fuel flow rate and an air flow rate supplied to burners and an air flow rate supplied to air supply ports other than the burners, and by using, as the output data, position data of a stream line representing a locus of a gas flow supplied from said burners and said air supply ports;
stream line drawing unit for receiving the stream line position data output from said stream line data calculating unit, and executing a calculation process for drawing the stream line on a display screen as an image; and
image displaying unit for displaying the stream line of gas supplied from said burners and said air supply ports and visualized by said stream line drawing unit.

12. The control apparatus for a boiler plant according to claim 11, further comprising:
stream line data interpolating unit for interpolating discrete data of a stream line position output from said stream line data calculating unit,
wherein said stream line drawing unit receives the stream line position data output from said stream line data calculating unit added to interpolation data calculated by said stream line data interpolating unit, and executes a calculation process for drawing an image on the display screen.

13. The control apparatus for a boiler plant according to claim 11, further comprising:
condition adaptive data extracting unit for extracting the stream line position data adaptive to a designated condition, from the stream line position data output from said stream line data calculating unit,
wherein said stream line data drawing unit received data extracted by said condition adaptive data extracting unit and executes a calculation process for drawing the data on the display screen as an image.

14. The control apparatus for a boiler plant according to claim 11, further comprising:

condition adaptive data extracting unit for extracting the stream line position data adaptive to a designated condition, from the stream line position data output from said stream line data calculating unit; and stream line data interpolating unit for interpolating discrete data of the stream position selected by said condition adaptive data extracting unit, wherein said stream line drawing unit receives the data selected by said condition adaptive data extracting unit added to interpolation data calculated by said stream line data interpolating unit, and executes a calculation process for drawing an image on the display screen.

15. The control apparatus for a boiler plant according to claim 13, wherein said condition adaptive data extracting unit uses, as an index of a designation condition, at least one value selected from a group consisting of a carbon monoxide density, an oxygen density, a nitrogen oxide density, a sulfur oxide density, a mercury density, a volatile organic compound density and a not-burnt duel density at a predetermined position and in a predetermined flow path area of a gas flow path in the boiler.

16. The control apparatus for a boiler plant according to claim 11, wherein said stream line data calculating unit is a neural net for calculating a locus of a gas flow supplied from said burners and said air supply ports, by using, as input data, a fuel flow rate and an air flow rate supplied to said burners, an air flow rate supplied to said air supply ports, and by using, as output data, coordinate data of stream lines having said burners and said air supply ports as start points, a flow speed, a gas temperature, an oxygen density, a carbon monoxide density and a nitrogen oxide density at each coordinate position.

17. The control apparatus for a boiler plant according to claim 16, said neural net is divided for each burner and for each air supply port other than the burner.

18. A control apparatus for a plant having a boiler comprising:

a knowledge database updating unit has at least one of a knowledge evaluation functional block, a knowledge correction functional block and a knowledge addition functional block;

said knowledge evaluation functional block comprises unit for extracting the number of use times of knowledge regarding the running characteristics in said knowledge database from an analysis result database;

unit for calculating a larger evaluation value of the knowledge the larger the number of use times of the knowledge is; and unit for storing the knowledge evaluation value in said knowledge database; said knowledge correction functional block comprises:

unit for selecting knowledge to be corrected from said knowledge database;

unit for correcting the knowledge so as not to contradict information in said numerical value analysis database, said measurement signal database and said operation signal database;

and unit for storing the corrected knowledge in said knowledge database; and said knowledge addition functional block comprises: unit for generating a hypothesis of knowledge;

unit for evaluating adequacy of said hypothesis by using information in said numerical value analysis result database, said measurement signal database and said operation signal database;

and unit for storing, if said evaluation result is good, said hypothesis in said knowledge database;

and image display unit for displaying a stream line representative of a locus of a gas flow supplied from burners and air support ports other than the burners on a screen, by using a numerical value analysis result including at least a gas flow phenomenon occurring in the boiler.

19. The control apparatus for a boiler plant according to claim 11, wherein said image display unit displays at the same time at least some or all of measurement values and control command values of a fuel flow rate and an air flow rate supplied to burners and an air flow rate supplied to air supply ports other than the burners, and a stream lie image of the gas supplied from said burners and said air supply ports.

20. An operator training apparatus for a plant having a boiler, comprising:

phenomenon visualizing unit for visualizing a phenomenon in the boiler to display a relation between a control operation and the phenomenon in the boiler; and image display unit for the relation visualized by said phenomenon visualizing unit on a screen, wherein said phenomenon visualizing unit comprises: stream line data calculating unit for learning a relation between input data and output data by using a numerical analysis result including at least a gas flow phenomenon occurring in the boiler, and by using, as the input data, at least a fuel flow rate and an air flow rate supplied to burners and an air flow rate supplied to air supply ports other than the burners, and by using, as the output data, position data of a stream line representing a locus of a gas flow supplied from said burners and said air supply ports; stream line drawing unit for receiving the stream line position data output from said stream line data calculating unit, and executing a calculation process for drawing the stream line on a display screen as an image; and image displaying unit for displaying the stream line of gas supplied from said burners and said air supply ports and visualized by said stream line drawing unit, and wherein a stream line of the gas supplied from said burners and said air supply ports and visualized by said stream line drawing unit is displayed on the screen of said image displaying unit.

* * * * *